United States Patent
Kojima et al.

(10) Patent No.: US 9,869,260 B2
(45) Date of Patent: Jan. 16, 2018

(54) CONTROL DEVICE OF MULTI-CYLINDER INTERNAL COMBUSTION ENGINE

(71) Applicant: TOYOTA JIDOSHA KABUSHIKI KAISHA, Toyota-shi, Aichi-ken (JP)

(72) Inventors: Susumu Kojima, Susono (JP); Yusuke Suzuki, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/066,355

(22) Filed: Mar. 10, 2016

(65) Prior Publication Data
US 2016/0265463 A1    Sep. 15, 2016

(30) Foreign Application Priority Data
Mar. 12, 2015   (JP) .................. 2015-048931

(51) Int. Cl.
*F02D 41/06* (2006.01)
*F02D 41/04* (2006.01)
(Continued)

(52) U.S. Cl.
CPC ....... *F02D 41/065* (2013.01); *F02D 41/0002* (2013.01); *F02D 41/021* (2013.01);
(Continued)

(58) Field of Classification Search
CPC .. F02D 41/0002; F02D 41/021; F02D 41/041; F02D 41/065; F02D 41/3836; F02D 2200/0801; F02D 2200/501; F02D 2250/31; Y02T 10/42; Y02T 10/44; Y02T 10/46; Y02T 10/48; F02N 11/0844
(Continued)

(56) References Cited

U.S. PATENT DOCUMENTS 4,286,683 A * 9/1981 Zeigner .................. B60K 15/00
                                                       123/179.4
5,826,671 A * 10/1998 Nakae .................... B60K 6/445
                                                       123/179.4
(Continued)

FOREIGN PATENT DOCUMENTS

JP  2003-065104 A  3/2003
JP  2003-314321 A  11/2003
(Continued)

*Primary Examiner* — John Kwon
*Assistant Examiner* — Johnny H Hoang
(74) *Attorney, Agent, or Firm* — Andrews Kurth Kenyon LLP

(57) ABSTRACT

The control device executes a first control for controlling a throttle valve opening degree to a first opening degree when a particular condition is satisfied. The particular condition is a condition that it is predicted upon a satisfaction of an engine stop condition that a level of one of noise and vibration generated in an interior of a vehicle from a source other than an engine is equal to or larger than a predetermined level when an engine rotation stops. The control device executes a second control for controlling the throttle valve opening degree to a second opening degree larger than the first opening degree without executing the first control when the particular condition is not satisfied upon the satisfaction of the engine stop condition.

5 Claims, 15 Drawing Sheets

(51) Int. Cl.
*F02D 41/02* (2006.01)
*F02N 11/08* (2006.01)
*F02D 41/00* (2006.01)
*F02D 41/38* (2006.01)

(52) U.S. Cl.
CPC ........ *F02D 41/042* (2013.01); *F02N 11/0844* (2013.01); *F02D 41/3836* (2013.01); *F02D 2200/501* (2013.01); *F02D 2250/31* (2013.01); *F02N 2200/0801* (2013.01); *Y02T 10/42* (2013.01); *Y02T 10/48* (2013.01)

(58) Field of Classification Search
USPC ................................ 701/102–105, 112–115; 123/179.3–179.5, 198 D, 198 DB, 123/198 DC, 198 F
See application file for complete search history.

(56) References Cited

U.S. PATENT DOCUMENTS

| | | | |
|---|---|---|---|
| 6,275,759 B1* | 8/2001 | Nakajima | B60K 6/543 |
| | | | 123/179.4 |
| 6,379,284 B1* | 4/2002 | Hanai | F02D 41/062 |
| | | | 123/491 |
| 9,422,861 B2* | 8/2016 | Miyagawa | F02B 77/11 |
| 2003/0041830 A1 | 3/2003 | Sugiura et al. | |
| 2005/0262827 A1* | 12/2005 | Ichimoto | B60K 6/445 |
| | | | 60/277 |
| 2006/0027215 A1* | 2/2006 | Okochi | F02D 11/106 |
| | | | 123/492 |
| 2007/0199533 A1* | 8/2007 | Takahashi | F02D 17/04 |
| | | | 123/179.4 |
| 2009/0048050 A1 | 2/2009 | Kamada et al. | |
| 2011/0202254 A1 | 8/2011 | Ishikawa et al. | |
| 2013/0131959 A1* | 5/2013 | Shoda | F02D 41/0002 |
| | | | 701/103 |
| 2013/0166173 A1 | 6/2013 | Ideshio et al. | |

FOREIGN PATENT DOCUMENTS

| | | |
|---|---|---|
| JP | 2004-316492 A | 11/2004 |
| JP | 2006-273305 A | 10/2006 |
| JP | 2011-169225 A | 9/2011 |
| WO | 2013/061378 A1 | 5/2013 |

* cited by examiner

CONTROL DEVICE OF MULTI-CYLINDER INTERNAL COMBUSTION ENGINE

CROSS-REFERENCE TO RELATED APPLICATION

The present application claims priority to Japanese Patent Application No. 2015-048931 filed on Mar. 12, 2015, which is incorporated herein by reference in its entirety.

BACKGROUND OF THE INVENTION

Field of the Invention

The present invention relates to a control device of a multi-cylinder internal combustion engine, which is configured to execute an engine stop control for stopping a rotation of the engine when a predetermined engine stop condition is satisfied and an engine start control for starting or restarting the rotation of the engine when a predetermined engine start condition is satisfied.

Description of the Related Art

There is known an internal combustion engine which is configured to execute an engine stop control for stopping fuel injections to stop an engine rotation when a condition for stopping the engine rotation (i.e., an engine stop condition) is satisfied.

The engine stop condition is satisfied, for example, when an acceleration pedal is not operated or a brake pedal is operated and a speed of a vehicle (a vehicle speed), in which the engine is installed, decreases to below a predetermined speed.

Further, there is known an internal combustion engine which is configured to execute an engine start control for carrying out a fuel injection and a fuel ignition in a combustion stroke cylinder when a condition for starting the engine rotation (i.e., an engine start condition) is satisfied after the engine rotation stops (for example, see JP 2004-316492 A). Hereinafter this engine will be referred to as "the conventional engine". It should be noted that the combustion stroke cylinder is a cylinder in which a piston of this cylinder stops in a combustion stroke when the engine rotation stops.

SUMMARY OF THE INVENTION

The conventional engine is configured to execute an opening degree increase control for increasing an opening degree of a throttle valve to a predetermined opening degree when the engine stop condition is satisfied. The predetermined opening degree is larger than the opening degree of the throttle valve controlled immediately before the satisfaction of the engine stop condition.

Even when an engine speed approaches zero, the opening degree increase control can cause exhaust gas to be sufficiently discharged from cylinders of the engine and increase an amount of air suctioned into each of the cylinders (i.e., increase an in-cylinder air amount). Thereby, the engine operation can be assuredly started by the engine start control for carrying out the fuel injection and the fuel ignition in the combustion stroke cylinder (i.e., executing the engine start control). In addition, when the opening degree increase control is executed, the engine operation can be started by the engine start control even before the engine rotation stops completely.

In this regard, when the start of the engine operation is not requested after the opening degree increase control is executed and thus, the engine rotation stops, a crank shaft of the engine rotates back and forth repeatedly many times immediately before the stop of the engine rotation.

In particular, since the in-cylinder air amount is increased by the execution of the opening degree increase control, a reaction force against a compression increases in the cylinder, an engine stroke of which corresponding to a compression stroke immediately before the stop of the engine rotation. Thus, the piston cannot move beyond the compression top dead center. Therefore, a rotation direction of the crank shaft changes from the normal direction to the inverse direction.

At this time, the piston of the combustion stroke cylinder moves backwards toward the compression top dead center and the gas in this cylinder is compressed. However, the reaction force against this compression is large and thus, the piston of this combustion stroke cylinder cannot move beyond the compression top dead center. Thus, the rotation direction of the crank shaft changes from the inverse direction to the normal direction.

For this reason, the crank shaft rotates back and forth repeatedly many times immediately before the stop of the engine rotation.

When the engine (the crank shaft) rotates back and forth repeatedly many times immediately before the stop of the engine rotation, relatively large noise and/or vibration are generated from the engine. In this case, a driver and passengers of the vehicle may be subject to a discomfort due to the generated noise and the vibration.

The present invention solves the aforementioned problem. In other words, one of the objects of the present invention is to provide a control device of a multi-cylinder internal combustion engine in which the driver and the passengers of the vehicle is unlikely to be subject to a discomfort due to the noise and/or the vibration generated from the engine immediately before the stop of the engine rotation.

A control device according to the present invention (hereinafter, will be referred to as "the invention device") is applied to a multi-cylinder internal combustion engine (10) installed in a vehicle.

The engine (10) comprising:
at least two combustion chambers (25);
at least two fuel injectors (39) provided corresponding to the combustion chambers (25), respectively, each of the fuel injectors (39) being configured to inject fuel directly into the corresponding combustion chamber (25);
a throttle valve (45) for controlling an amount of air supplied to the combustion chambers (25); and
at least two ignition devices (35) provided corresponding to the combustion chambers (25), respectively, each of the ignition devices (35) including an ignition plug (37).

The invention device comprises a control section (80) for controlling operations of the fuel injectors (39), the throttle valves (45) and the ignition devices (35).

The control section (80) is configured to execute an engine stop control for causing the fuel injectors (39) to stop injecting fuel to stop a rotation of the engine (10) when a predetermined engine stop condition is satisfied, the predetermined engine stop condition including a condition that a speed of the vehicle is equal to or smaller than an engine stop condition speed.

Further, the control section (80) is configured to execute an ignition engine start control for causing the fuel injector (39) corresponding to the combustion chamber (25), an engine stroke of which corresponding to a combustion stroke, to inject fuel and causing the corresponding ignition device (35) to ignite the fuel to start the rotation of the engine (10) when a predetermined ignition engine start condition is satisfied after the start of the engine stop control, the predetermined ignition engine start condition including a condition that an engine start request for starting the rotation of the engine (10) is generated.

Further, the control section (80) is configured to execute a first opening degree control for controlling an opening degree of the throttle valve (45) to a first opening degree when a particular condition is satisfied.

In this regard, the first opening degree is larger than the opening degree of the throttle valve (45) controlled immediately before the satisfaction of the engine stop condition.

Further, the particular condition is a condition that it is predicted upon the satisfaction of the engine stop condition that a level of one of noise and vibration generated in an interior of the vehicle from a source other than the engine (10) is equal to or larger than a predetermined level when the rotation of the engine (10) stops.

On the other hand, the control section (80) is configured to execute a second opening degree control for controlling the opening degree of the throttle valve (45) to a second opening degree larger than the first opening degree without executing the first opening degree control when the particular condition is not satisfied upon the satisfaction of the engine stop condition.

Even when the engine speed approaches zero, the first opening degree control can cause gas to be sufficiently discharged from the combustion chambers to an exhaust passage of the engine and increase an amount of air suctioned into each of the combustion chambers (i.e., increase an in-cylinder air amount). Therefore, the engine rotation can be assuredly started by the execution of the ignition engine start control.

On the other hand, when the first opening degree control is executed and then, the engine rotation stops without the generation of the request of starting the engine rotation, the in-cylinder air amount is large as described above. Thus, immediately before the stop of the engine rotation, the crank shaft rotates back and forth repeatedly many times. In this case, the relatively large noise and/or vibration are generated from the engine. Thus, the noise and/or vibration may lead to a discomfort to the driver and the passengers of the vehicle.

In this regard, the invention device does not execute the first opening degree control when the particular condition is not satisfied. As described above, the particular condition is a condition that it is predicted that the level of the noise and vibration generated in the interior of the vehicle generated from the source other than the engine upon the stop of the engine rotation is equal to or larger than the predetermined level.

In other words, the invention device executes the first opening degree control only when the particular condition is satisfied.

Further, in other words, the invention device does not execute the first opening degree control when the driver and the passengers of the vehicle may be subject to a discomfort due to the noise and/or the vibration generated from the engine immediately before the stop of the engine rotation. Instead, the invention device executes the first opening degree control only when the driver and the passengers is unlikely to be subject to such a discomfort.

Therefore, according to the invention device, it is possible to decrease a possibility that the driver and the passengers are subject to a discomfort derived from the noise and/or the vibration generated from the engine immediately before the stop of the engine rotation.

Further, according to an aspect of the present invention, the particular condition may be satisfied when satisfied is a condition that a speed of the vehicle is equal to or larger than a predetermined particular condition speed smaller than the engine stop condition speed.

The speed of the vehicle (i.e., a vehicle speed) is an index value which appropriately indicates the level of the noise and/or the vibration generated from the vehicle, that is, the level of the noise and/or the vibration generated from a source other than the engine. Therefore, by using the vehicle speed to determine whether or not the particular condition is satisfied, it can be appropriately determined whether or not the driver and the passengers may be subject to a discomfort due to the noise and/or the vibration generated from the engine when the engine rotation stops while the first opening degree control is executed.

Further, according to another aspect of the present invention, when the engine (10) further comprises a starter motor (26), the ignition engine start condition may further include a condition that the first opening degree control is executed. In this case, the control section (80) may be configured to execute a starter engine start control for starting the rotation of the engine (10) by using the starter motor (26) when a predetermined starter engine start condition is satisfied. In this regard, the predetermined starter engine start condition includes a condition that the engine start request is generated and the second opening degree control is executed after the start of the engine stop control.

According to this aspect, even when the first opening degree is not executed and thus, the in-cylinder air amount is relatively small, the engine rotation is started by using the starter motor. Therefore, the engine rotation can be assuredly started.

Further, according to another aspect of the present invention, the starter engine start condition may further include a condition that the rotation speed of the engine (10) is equal to or smaller than a predetermined starter engine start rotation speed.

When the rotation speed of the engine is excessively large, the starter motor cannot supply the engine with a rotation torque sufficient for the start of the engine rotation. Therefore, by activating the starter motor when the rotation speed of the engine becomes relatively small, the engine can be supplied from the starter motor with a rotation torque sufficient for the start of the engine rotation.

Further, according to another aspect of the present invention, the control section (80) may be configured to increase a resistance against the rotation of the engine (10) to a predetermined resistance when the particular condition is not satisfied upon the satisfaction of the engine stop condition. In addition, the predetermined resistance is larger than a resistance against the rotation of the engine (10) immediately before the satisfaction of the engine stop condition.

As described above, when the rotation speed of the engine is excessively large, the starter motor cannot supply the engine with a rotation torque sufficient for starting the engine rotation. According to the invention device, the engine rotation is started by the execution of the starter engine start control when the particular condition is not satisfied and the engine start request is generated during the execution of the engine stop control. In this case, the resistance against the engine rotation is increased to the predetermined resistance larger than the resistance against the engine rotation immediately before the satisfaction of the engine stop condition. Accordingly, the rotation speed of the engine decreases at a large rate. Thus, after the engine start request is generated, the starter engine start condition is satisfied at an early timing. Thus, the starter engine start control can be started at an early timing. Therefore, after the engine start request is generated, the engine rotation can be started at an early timing.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE PREFERRED EMBODIMENTS

Below, a control device of a multi-cylinder internal combustion engine according to an embodiment of the present invention will be described with reference to the drawings.

Figure 1:
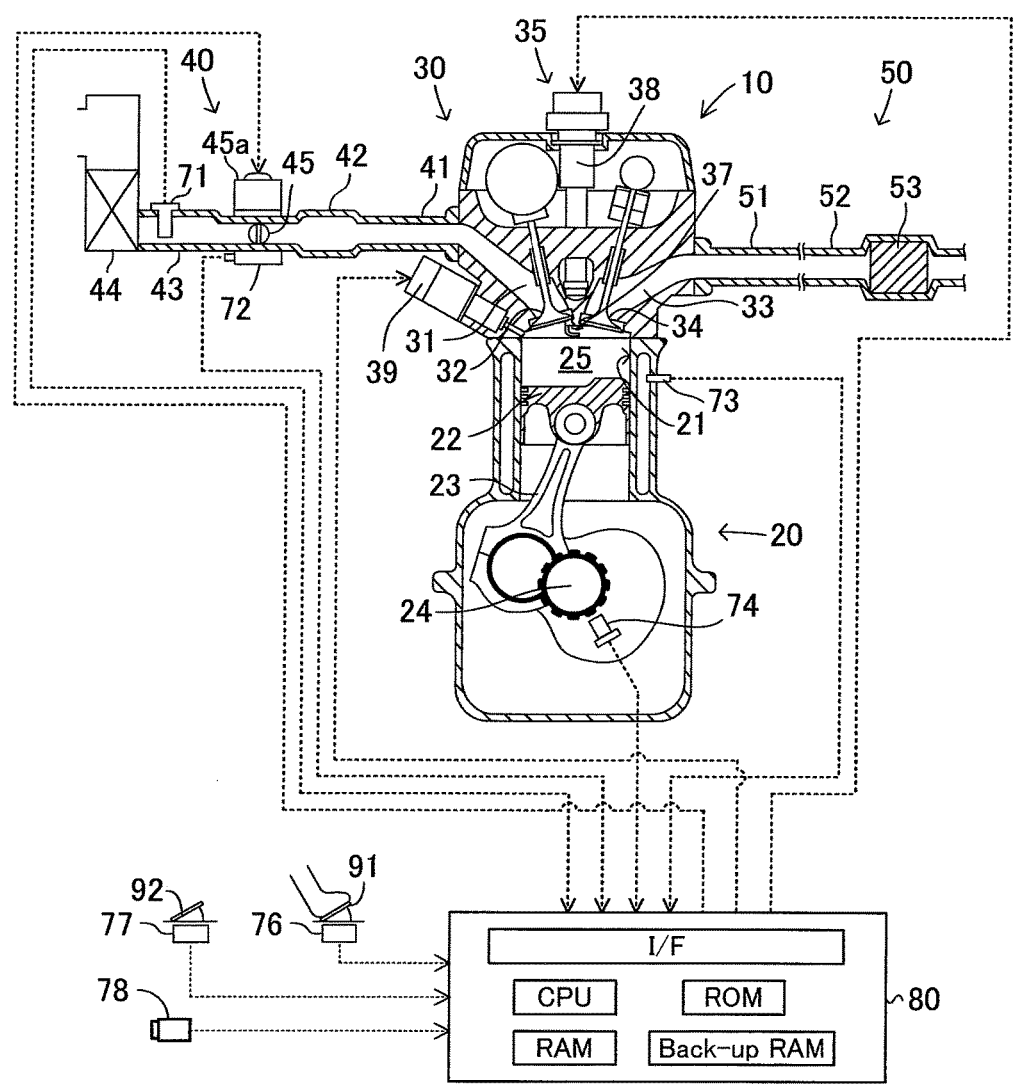
FIG. 1 shows a general view of a multi-cylinder internal combustion engine provided with a control device according to an embodiment of the present invention.
Figure 2:
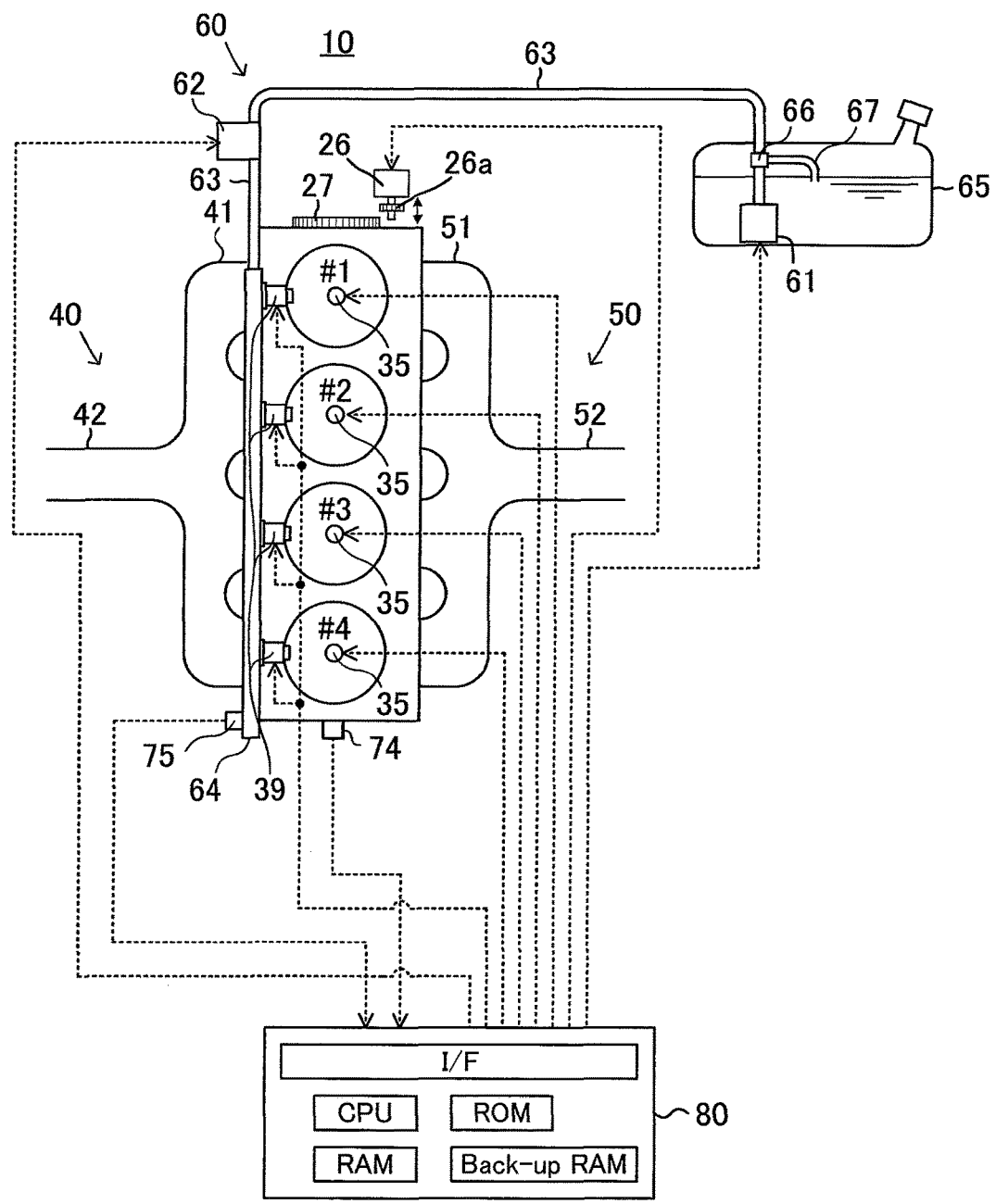
FIG. 2 shows a plan view of the multi-cylinder engine shown in FIG. 1.

The present control device is applied to an internal combustion engine 10 shown in FIGS. 1 and 2. The engine 10 is a multi-cylinder (in this embodiment, linear-four-cylinder) four-cycle piston-reciprocating in-cylinder-injection (i.e., direct-injection) spark-ignition type gasoline internal combustion engine.

The engine 10 includes a cylinder block 20, a cylinder head part 30, an intake system 40 and an exhaust system 50. The cylinder block part 20 includes a cylinder block lower case, an oil pan and the like. The cylinder head part 30 is mounted on the cylinder block part 20. The intake system 40 serves to supply the cylinder block part 20 with air. The exhaust system 50 serves to discharge exhaust gas from the cylinder block part 20 to the outside.

Further, as shown in FIG. 2, the engine 10 includes a fuel supply system 60 for supplying the cylinder block part 20 with fuel.

As shown in FIG. 1, the cylinder block part 20 includes cylinder bores 21, pistons 22, connection rods 23 and a crank shaft 24. The respective pistons 22 move reciprocally in the respective cylinder bores 21. The reciprocal movements of the respective pistons 22 are transmitted to the crank shaft 24 via the respective connection rods 23. Thereby, the crank shaft 24 is caused to be rotated. The respective cylinder bores 21, the respective pistons 22 and the cylinder head part 30 form respective combustion chambers (respective cylinders) 25.

Further, as shown in FIG. 2, the cylinder block part 20 includes a starter motor 26. The starter motor 26 drives in response to a command sent from an engine ECU (i.e., an engine electronic control unit) 80 described later and is configured to mesh a ring gear 27 secured to the crank shaft 24 with a pinion gear 26a to rotate the ring gear 27. The rotation of the ring gear 27 supplies the crank shaft 24 with a rotation torque to cause the crank shaft 24 to rotate.

The starter motor 26 of this embodiment is a starter motor which starts the rotation of the pinion gear 26a as well as the mesh of the pinion gear 26a with the ring gear 27 generally simultaneously.

Again, referring to FIG. 1, the cylinder head part 30 includes intake ports 31, intake valves 32, exhaust ports 33, exhaust valves 34, ignition devices 35 and fuel injectors 39. The respective intake ports 31 are connected in communication with the respective combustion chambers 25. The respective intake valves 32 open and close the respective intake ports 31. The respective exhaust ports 33 are connected in communication with the respective combustion chambers 25. The respective exhaust valves 34 open and close the respective exhaust ports 33. The respective ignition devices 35 ignite fuel in the respective combustion chambers 25. The respective fuel injectors 39 inject fuel directly into the respective combustion chambers 25.

Each of the ignition devices 35 includes an ignition plug 37 and an igniter 38 including an ignition coil for generating high voltage to be supplied to the ignition plug 37. The igniter 38 is configured to cause the ignition coil to generate high voltage in response to a command sent from the ECU 80 described later. This high voltage is supplied to the ignition plug 37 and the ignition plug 37 produces a spark.

The fuel injectors 39 are provided in the cylinder head part 30 such that fuel injection holes of the respective fuel injectors 39 expose to interiors of the respective combustion chambers 25. The fuel injector 39 is configured to open in response to a command sent from the ECU 80 described later to inject fuel directly into the corresponding combustion chamber 25.

The intake system 40 includes an intake manifold 41, a surge tank 42 and an intake pipe 43. The intake manifold 41 is connected in communication with the intake ports 31. The surge tank 42 is connected in communication with the intake manifold 41. The intake pipe 43 is connected in communication with the surge tank 42 at an end of the intake pipe 43. The intake ports 31, the intake manifold 41, the surge tank 42 and the intake pipe 43 form an intake passage.

Further, the intake system 40 includes an air filter 44, a throttle valve 45 and a throttle valve actuator 45a in order from the other end of the intake pipe 43 toward a downstream side (i.e., toward the surge tank 42). The air filter 44 and the throttle valve 45 are provided in the intake pipe 43 and the throttle valve actuator 45a is provided on the intake pipe 43.

The throttle valve 45 is supported rotatably in the intake pipe 43. The throttle valve 45 is configured to be driven by the throttle valve actuator 45a. Thereby, an opening degree of the throttle valve 45 is adjusted by the throttle valve actuator 45a. The throttle valve actuator 45a is comprised of a DC motor. The throttle valve actuator 45a is configured to drive the throttle valve 45 in response to a command sent from the ECU 80.

The exhaust system 50 includes an exhaust manifold 51 and an exhaust pipe 52. The exhaust manifold 51 is connected in communication with the exhaust ports 33. The exhaust pipe 52 is connected in communication with the exhaust manifold 51. The exhaust ports 33, the exhaust manifold 51 and the exhaust pipe 52 form an exhaust passage.

Further, the exhaust system 50 includes a three-way catalyst 53 provided in the exhaust pipe 52. The three-way catalyst 53 is a so-called three-way catalyst device (i.e., an exhaust purification catalyst) which carries active components comprised of noble metal such as platinum. The three-way catalyst 53 has an oxidation function for oxidizing unburned components such as HC, CO and $H_2$ and a reduction function for reducing NOx (i.e., nitrogen oxide) when an air-fuel ratio of a gas flowing into the three-way catalyst 53 corresponds to the stoichiometric air-fuel ratio.

Further, the three-way catalyst 53 has an oxygen absorption function for absorbing or storing oxygen therein. With this oxygen absorption function, the three-way catalyst 53 can purify the unburned components and the NOx even when the air-fuel ratio of the gas flowing into the three-way catalyst 53 does not correspond to the stoichiometric air-fuel ratio. This oxygen absorption function is derived from ceria (i.e., $CeO_2$) carried on the three-way catalyst 53.

As shown in FIG. 2, the fuel supply system 60 includes a low pressure fuel pump 61, a high pressure fuel pump 62, a fuel discharge pipe 63, a delivery pipe (or a pressure accumulation chamber) 64 and a fuel tank 65. The fuel discharge pipe 63 connects the low pressure fuel pump 61 to the delivery pipe 64 in communication manner. The delivery pipe 64 is connected in communication with the fuel injectors 39.

The low pressure fuel pump 61 is provided in the fuel tank 65. The low pressure fuel pump 61 is driven by an electric motor activated in response to a command sent from the ECU 80 described later to discharge fuel stored in the fuel tank 65 to the fuel discharge pipe 63.

The high pressure fuel pump 62 is interposed in the fuel discharge pipe 63. The high pressure fuel pump 62 is configured to pressurize fuel, which reaches the high pressure fuel pump 62 from the low pressure fuel pump 61 through the fuel discharge pipe 63, and supply the delivery pipe 64 with the pressurized fuel having a high pressure through the fuel discharge pipe 63. The high pressure fuel pump 62 is activated by a drive shaft coordinating with the crank shaft 24 of the engine 10.

The high pressure fuel pump 62 includes an electromagnetic valve not shown in a fuel suction part of the high pressure fuel pump 62. The electromagnetic valve is opened in response to a command sent from the ECU 80 upon a start of an operation of suctioning fuel by the high pressure fuel pump 62. On the other hand, the electromagnetic valve is closed in response to a command sent from the ECU 80 at a predetermined timing during an operation of pressurizing fuel. As a timing of closing the electromagnetic valve advances, an effective stroke of a plunger not shown of the high pressure fuel pump 62 increases and thus, an amount of fuel discharged from the high pressure fuel pump 62 increases. As a result, a pressure of fuel supplied to the fuel injectors 39 increases. In other words, the high pressure fuel pump 62 is configured to adjust a pressure of fuel in the delivery pipe 64 (or a fuel injection pressure or a delivery pipe pressure or a fuel pressure) in response to a command sent from the ECU 80.

Further, a relief valve 66 is interposed in the fuel discharge pipe 63 in the fuel tank 65. When a pressure of fuel in the fuel discharge pipe 63 reaches a predetermined pressure, the relief valve 66 is opened by the pressure of the fuel. When the relief valve 66 opens, a part of the fuel discharged from the low pressure fuel pump 61 to the fuel discharge pipe 63 is returned to the fuel tank 65 via the relief valve 66 and a relief pipe 67 connected in communication with the relief valve 66.

The ECU 80 is comprised of an electronic circuit including a known microcomputer. The ECU 80 includes a CPU, a ROM, a RAM, a back-up RAM, an interface and the like. The ECU 80 is connected to various sensors described below and receives signals from these sensors. Further, the ECU 80 is configured to send command signals or drive signals to various actuators such as the throttle valve actuator 45a, the ignition devices 35 and the fuel injectors 39, respectively.

As shown in FIGS. 1 and 2, the ECU 80 is connected to an air flow meter 71, a throttle position sensor 72, a water temperature sensor 73, a crank angle sensor 74, a fuel pressure sensor 75, an acceleration pedal operation amount sensor 76, a brake sensor 77 and a vehicle speed sensor 78.

The air flow meter 71 is provided in the intake pipe 43. The air flow meter 71 is configured to measure a mass flow of air passing through the air flow meter 71 (i.e., an intake air amount) and output a signal expressing the intake air amount Ga.

The throttle position sensor 72 is provided adjacent to the throttle valve 45 on the intake pipe 43. The throttle position sensor 72 is configured to detect an opening degree of the throttle valve 45 (i.e., a throttle valve opening degree) and output a signal expressing the throttle valve opening degree TA.

The water temperature sensor 73 is provided in the cylinder block part 20. The water temperature sensor 73 is configured to measure a temperature of cooling water for cooling the engine 10 (i.e., a cooling water temperature) and output a signal expressing the cooling water temperature THW.

The crank angle sensor 74 is provided in the cylinder block part 20. The crank angle sensor 74 is configured to output a signal depending on a rotation position of the crank shaft 24 (i.e., a crank angle). The ECU 80 acquires a crank angle of the engine 10 with respect to the compression top dead center of a predetermined cylinder of the cylinders 25 (i.e., an absolute crank angle) on the basis of signals output from the crank angle sensor 74 and a cam position sensor not shown. Further, the ECU 80 acquires an engine speed NE on the basis of signals output from the crank angle sensor 74.

The fuel pressure sensor 75 is provided in the delivery pipe 64 (see FIG. 2). The fuel pressure sensor 75 is configured to measure a pressure of fuel supplied to the fuel injectors 39 (i.e., a delivery pipe pressure or a fuel pressure) and output a signal expressing the fuel pressure PF.

The present control device controls a command signal sent to the high pressure fuel pump 62 such that a difference between the fuel pressure PF acquired on the basis of a signal output from the fuel pressure sensor 75 and a target fuel pressure PFtgt becomes zero. For example, when the acquired fuel pressure PF is lower than the target fuel pressure PFtgt, the present control device controls a command signal sent to the high pressure fuel pump 62 such that an amount of fuel discharged from the high pressure fuel pump 62 is caused to be increased. Thereby, a pressure of fuel supplied to the fuel injectors 39 (i.e., the fuel pressure PF) is increased.

The acceleration pedal operation amount sensor 76 is configured to detect an operation amount of an acceleration pedal 91 (i.e., an acceleration pedal operation amount) and output a signal expressing the acceleration pedal operation amount Accp (see FIG. 1). It should be noted that the ECU 80 drives the throttle valve actuator 45*a* such that the throttle valve opening degree TA increases as the acceleration pedal operation amount Accp increases except for a specific case described later.

The brake pedal sensor 77 is configured to detect an operation amount of a brake pedal 92 (i.e., a brake pedal operation amount) and output a signal expressing the brake pedal operation amount Brkp. It should be noted that the brake pedal sensor 77 may be a switch which outputs a high signal when the brake pedal 92 is operated (i.e., when an operation state of the brake pedal 92 corresponds to an on-state) and outputs an off signal when the brake pedal 92 is not operated (i.e., when the operation state of the brake pedal 92 corresponds to an off-state).

The vehicle speed sensor 78 is configured to measure a speed of a vehicle (i.e., a vehicle speed), on which the engine 10 is installed, and output a signal expressing the vehicle speed SPD.

<Summary of Engine Stop Control by Control Device>

Next, a summary of an engine stop control executed by the present control device will be described. The present control device decreases the engine speed NE to zero to stop a rotation of the engine 10 (i.e., an engine rotation or an engine operation) when satisfied is a condition for causing the engine speed NE to zero, that is, a condition for stopping the engine rotation (i.e., an engine stop condition or an engine rotation stop condition or an engine operation stop condition). In other words, the present control device is configured to execute an engine stop control for causing the fuel injectors 39 to stop injecting fuel and causing the ignition devices 35 to stop igniting the fuel. Hereinafter, the injection of the fuel carried out by the fuel injectors 39 will be referred to as "fuel injections" or "fuel injection" and the ignition of the fuel carried out by the ignition devices 35 will be referred to as "fuel ignitions" or "fuel ignition".

In this example, the engine stop condition is satisfied when both of following conditions (1) and (2) are satisfied.

(1) The brake pedal 92 is depressed (or operated).

(2) The vehicle speed SPD is equal to or smaller than a predetermined speed (hereinafter, will be referred to as "the first speed") SPD1.

As described later, the present control device restarts the engine operation when a predetermined condition (i.e., an engine start condition) is satisfied during the execution of the engine stop control. At this time, the present control device may execute an ignition engine start control for restarting the engine operation by carrying out the fuel injection and the fuel ignition in the cylinder 25, an engine stroke of which corresponding to the combustion stroke. Hereinafter, this cylinder 25 will be referred to as "the combustion stroke cylinder 25".

It is preferred that an amount of air in the combustion stroke cylinder 25 is large in order to assuredly restart the engine operation by the execution of the ignition engine start control. In this regards, it is effective that the throttle valve opening degree TA is increased upon the satisfaction of the engine stop condition in order to increase the amount of air in the combustion stroke cylinder 25.

However, as described above, in case that the engine rotation stops without a generation of a request of starting the engine operation while the throttle valve opening degree TA is increased, the crank shaft 24 rotates back and forth repeatedly many times immediately before the stop of the engine rotation. When the crank shaft 24 rotates back and forth repeatedly many times, relatively large noise and vibration are generated from the engine 10.

In this case, if the vehicle speed SPD has been already zero before the engine rotation stops, no running noise and vibration is generated from the vehicle upon the stop of the engine rotation. Thus, the noise and the vibration generated from the engine 10 due to the stop of the engine rotation may lead to a discomfort to a driver and passengers of the vehicle.

Accordingly, when satisfied is a particular condition that it is predicted that the vehicle speed SPD is not zero upon the stop of the engine rotation by the execution of the engine stop control, the present control device executes an opening degree increase control (i.e., a first opening degree control) for increasing the throttle valve opening degree TA to an opening degree TAi larger than the throttle valve opening degree TA controlled immediately before the satisfaction of the engine stop condition.

On the other hand, the present control device executes an opening degree decrease control (i.e., a second opening degree control) for decreasing the throttle valve opening degree TA to zero without executing the opening degree increase control when the particular condition is not satisfied upon the satisfaction of the engine stop condition.

In other words, the present control device is configured to execute the opening degree increase control only when the particular condition is satisfied upon the satisfaction of the engine stop condition.

The engine stop control executed by the present control device including such an opening degree controls (i.e., the controls of the throttle valve opening degree) will be concretely described with reference to FIGS. 3 to 5.

Figure 3:
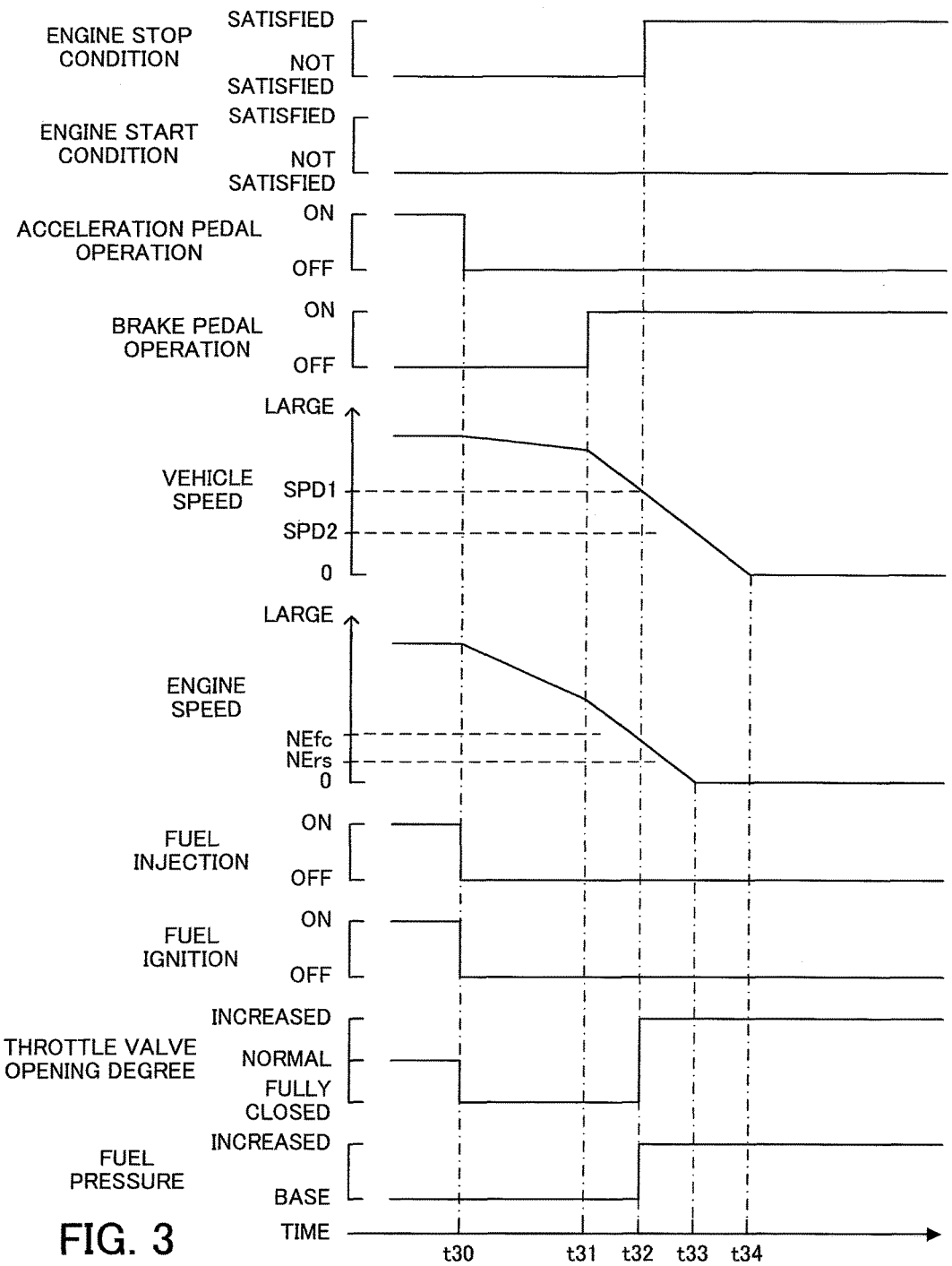
FIG. 3 shows a time chart used for describing one of patterns of an engine stop control executed by the control device according to the embodiment.

FIG. 3 shows the engine stop control executed when the vehicle speed SPD decreases to the first speed SPD1 and the engine stop control is satisfied.

In an example shown in FIG. 3, until a time t30, the acceleration pedal 91 is depressed, that is, the operation state of the acceleration pedal 91 corresponds to the on-state and the acceleration pedal operation amount Accp is larger than zero. Thus, until the time t30, the engine stop condition has not been satisfied. Therefore, until the time t30, the present control device sends command signals to the fuel injectors 39 and the ignition devices 35, respectively such that the fuel injections and the fuel ignitions are carried out.

In this example, at the time t30, the acceleration pedal 91 is released, that is, the operation state of the acceleration pedal 91 becomes the off-state and the acceleration pedal operation amount Accp becomes zero. At this time, the engine speed NE is equal to or larger than a fuel-cut engine speed NEfc described later. Thus, at the time t30, a fuel-cut condition is satisfied.

When the fuel-cut condition is satisfied, the present control device starts a fuel-cut control described later. In other words, the present control device stops the fuel injections and the fuel ignitions. The fuel-cut control is also a control for stopping the fuel injections and the fuel ignitions similar to the engine stop control. However, the execution of the engine stop control is continued to be executed until the engine speed NE becomes zero as far as the acceleration pedal 91 is released. On the other hand, the execution of the fuel-cut control is stopped when the engine speed NE becomes equal to or smaller than an engine operation restart engine speed NErs described later even if the acceleration pedal 91 is released. Form this point of view, the fuel-cut control is different from the engine stop control.

It should be noted that in this example, at the time t30, the brake pedal 92 is released, that is, the operation state of the brake pedal 92 corresponds to the off-state (i.e., the brake pedal operation amount Brkp is zero) and the vehicle speed SPD is larger than the first speed SPD1. Thus, at the time t30, the engine stop condition is not satisfied.

Then, in this example, at a time t31, the brake pedal 92 is depressed, that is, the operation state of the brake pedal 92 becomes the on-state and the brake pedal operation amount Brkp becomes larger than zero.

Then, the vehicle speed SPD gradually decreases and at a time t32, the vehicle speed SPD reaches the first speed SPD1 (i.e., the engine stop condition speed). At this time, the brake pedal 92 is depressed and the vehicle speed SPD is equal to or smaller than the first speed SPD1. Thus, at the time t32, the engine stop condition is satisfied. Therefore, the present control device starts the engine stop control. In other words, the present control device stops the fuel injections and the fuel ignitions. However, in this example, at this time, the fuel injections and the fuel ignitions have been already stopped by the execution of the fuel-cut control. Thus, at the time t32, the present control device continues the stop of the fuel injections and the fuel ignitions. It should be noted that at this time, a clutch not shown of the vehicle provided with the engine 10 is released and a transmission of a driving power to drive wheels of the vehicle is stopped.

In addition, the vehicle speed SPD at the time t32 upon the satisfaction of the engine stop condition is equal to or larger than a second speed SPD2 (a particular condition speed). The second speed SPD2 is smaller than the first speed SPD1. In addition, the second speed SPD2 is set as a speed capable of stopping the engine rotation before the vehicle speed SPD becomes zero if the engine stop control is started when the vehicle speed SPD corresponds to the second speed SPD2. Therefore, in this example, when the vehicle speed SPD is equal to or larger than the second speed SPD2 upon the satisfaction of the engine stop condition, the particular condition is satisfied.

In this manner, at the time t32 upon the satisfaction of the engine stop condition, the particular condition is satisfied. Thus, the present control device executes the opening degree increase control for increasing the throttle valve opening degree TA to the opening degree TAi. As described above, the opening degree TAi is a value larger than the throttle valve opening degree TA controlled immediately before the start of the opening degree increase control. It should be noted that the throttle vale opening degree TA controlled immediately before the start of the opening degree increase control is zero or an idling engine operation learned opening degree which corresponds to the throttle valve opening degree previously learned for maintaining an idling engine rotation.

Further, in this example, when the particular condition is satisfied, the present control device executes a fuel pressure increase control for increasing the fuel pressure PF to a fuel pressure PFi. This fuel pressure PFi is set as a value higher than the fuel pressure PF controlled immediately before the start of the fuel pressure increase control. It should be noted that the fuel pressure PF controlled immediately before the start of the fuel pressure increase control is a base fuel pressure PFb. In this example, the base fuel pressure PFb corresponds to a constant fuel pressure set as a target fuel pressure PFtgt when a control other than the engine stop control is executed.

The throttle valve opening degree TA and the fuel pressure PF are increased in order to assuredly start the engine operation by the execution of the ignition engine start control described later when a restart of the engine operation is requested, that is, an engine start request is generated before the engine speed NE becomes zero, that is, before the engine rotation is stopped by the execution of the engine stop control.

In the example shown in FIG. 3, when the present control device executes the engine stop control, the engine speed NE and the vehicle speed SPD gradually decrease. Then, until a time t33, the engine start request is not generated. Thus, at the time t33, the engine speed NE becomes zero and the engine rotation stops. Then, at a time t34, the vehicle speed SPD becomes zero.

In this manner, the vehicle speed SPD is relatively larger than zero at the time t33 upon the stop of the engine rotation. Therefore, at the time t33 upon the stop of the engine rotation, a running noise and a running vibration of the vehicle are generated. Thus, even when relatively large noise and vibration are generated from the engine 10 due to the increase of the throttle valve opening degree TA immediately before the time t33 upon the stop of the engine rotation, such noise and the vibration are unlikely to lead to a discomfort to the user of the vehicle.

Next, an example shown in FIG. 4 will be described. FIG. 4 shows the engine stop control executed in case that the engine stop control is satisfied when the vehicle speed SPD is smaller than the first speed SPD1 and equal to or larger than the second speed SPD2.

Figure 4:
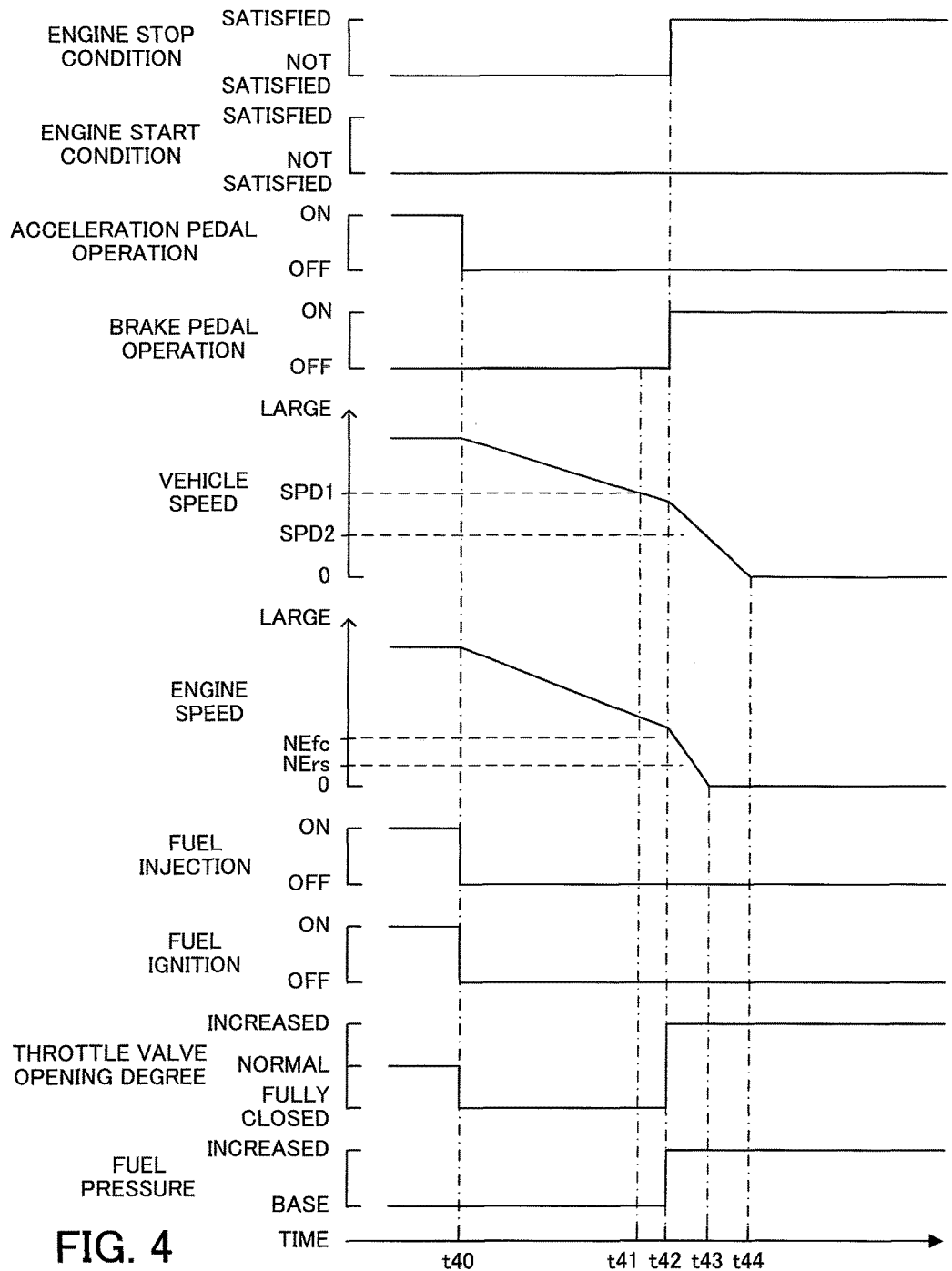
FIG. 4 shows a time chart used for describing another pattern of the engine stop control executed by the control device according to the embodiment.

Also, in the example shown in FIG. 4, before a time t40, the acceleration pedal 91 is depressed, the brake pedal 92 is released and the vehicle speed SPD is larger than the first speed SPD1. Therefore, before the time t40, the engine stop condition has not been satisfied. Thus, the present control device carries out the fuel injections and the fuel ignitions.

In this example, at the time t40, the acceleration pedal 91 is released. Thereby, the fuel-cut condition described later is satisfied. Thus, at the time t40, the present control device starts the fuel-cut control described later.

At a time t41, the vehicle speed SPD decreases to the first speed SPD1. At this time, the brake pedal 92 has been released. Therefore at the time t41, the engine stop condition is not satisfied.

Then, in this example, at a time t42, the brake pedal 92 is depressed. At this time, the vehicle speed SPD is equal to or smaller than the first speed SPD1. Thus, the engine stop condition is satisfied. Therefore, the present control device starts the engine stop control. In other words, the present control device stops the fuel injections and the fuel ignitions. However, at this time, similar to the example shown in FIG. 3, the fuel injections and the fuel ignitions have been already stopped by the execution of the fuel-cut control. Thus, at the time t42, the present control device continues the stop of the fuel injections and the fuel ignitions.

Further, at the time t42 upon the satisfaction of the engine stop condition, the vehicle speed SPD is equal to or larger than the second speed SPD2. Thus, the present control device executes the opening degree increase control and the fuel pressure increase control.

In the example shown in FIG. 4, when the present control device executes the engine stop control, the engine rotation stops at a time t43 and the engine speed NE becomes zero. Then, at a time t44, the vehicle speed SPD becomes zero.

As described above, at the time t43 upon the stop of the engine rotation, the vehicle speed SPD is larger than zero. Thus, running noise and vibration of the vehicle are generated at the time t43 upon the stop of the engine rotation. Thus, the user of the vehicle is unlikely to be subject to a discomfort due to a noise and a vibration generated from the engine 10 immediately before the time t43 upon the stop of the engine rotation.

Next, an example shown in FIG. 5 will be described. FIG. 5 shows the engine stop control executed in case that the engine stop condition is satisfied when the vehicle speed SPD is smaller than the second speed SPD2.

Figure 5:
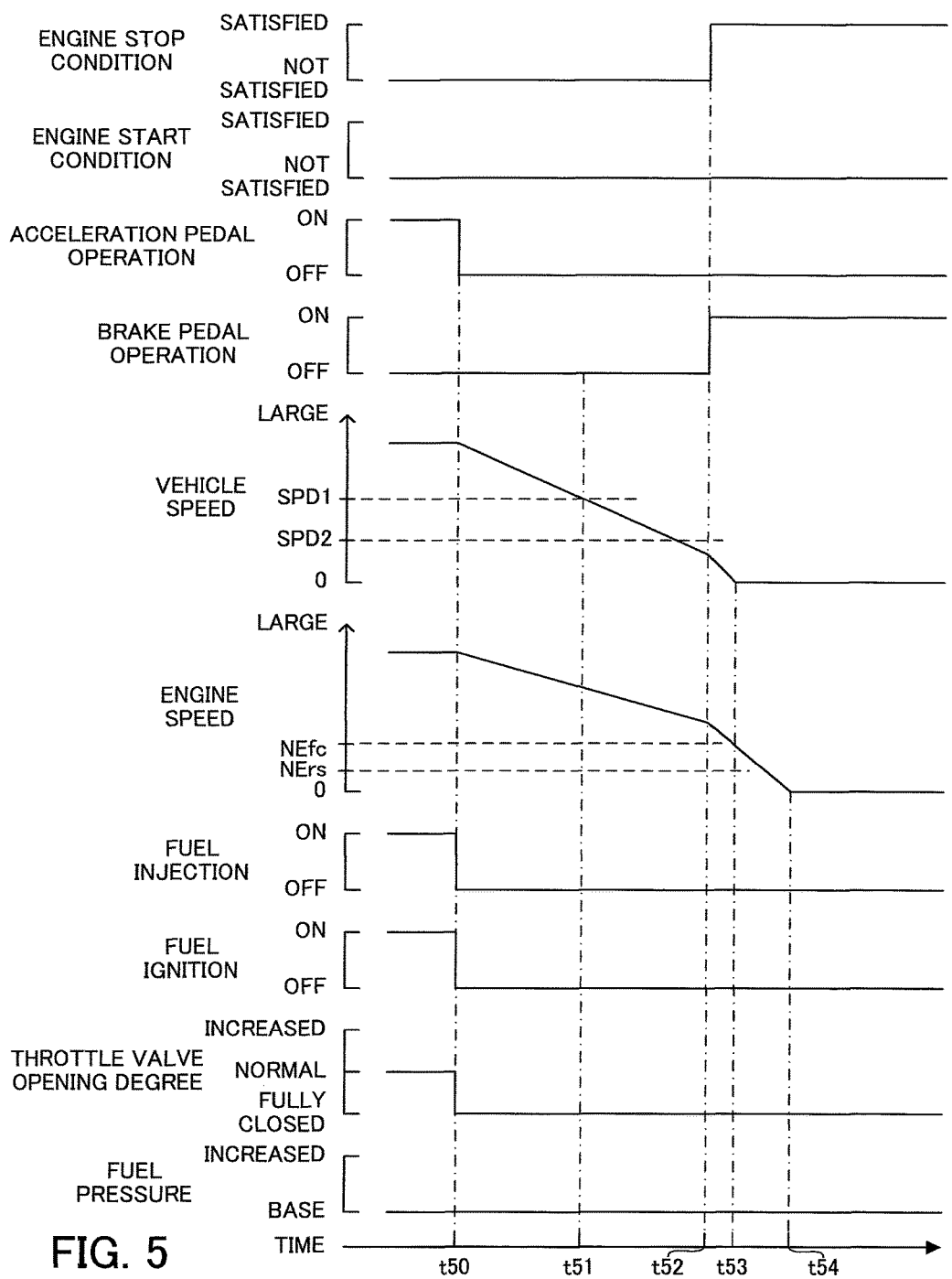
FIG. 5 shows a time chart used for describing further another pattern of the engine stop control executed by the control device according to the embodiment.

Also, in the example shown in FIG. 5, before a time t50, the acceleration pedal 91 is depressed, the brake pedal 92 is released and the vehicle speed SPD is larger than the first speed SPD1. Therefore, before the time t50, the engine stop condition has not been satisfied. Thus, the present control device carries out the fuel injections and the fuel ignitions.

At the time t50, the acceleration pedal 91 is released and thus, the fuel-cut condition described later is satisfied. Therefore, the present control device starts the fuel-cut control described later.

At a time t51, the vehicle speed SPD decreases to the first speed SPD1. At this time, the brake pedal 92 is released. Therefore, at the time t51, the engine stop condition is not satisfied. However, the acceleration pedal 91 is released. Thus, the present control device continues the execution of the fuel-cut control.

In this example, at a time t52, the brake pedal 92 is depressed. At this time, the vehicle speed SPD is equal to or smaller than the first speed SPD1. Thus, at the time t52, the engine stop condition is satisfied. Therefore, the present control device starts the engine stop control. In other words, the present control device continues the stop of the fuel injections and the fuel ignitions.

Further, at the time t52 upon the satisfaction of the engine stop condition, the vehicle speed SPD is smaller than the second speed SPD2. Thus, the present control device does not execute the opening degree increase control and the fuel pressure increase control. Instead, the present control device executes the opening degree decrease control (i.e., a second opening degree control) for causing the throttle valve opening degree TA to become zero and maintains the fuel pressure PF at the base fuel pressure PFb. It should be noted that in this example, according to the opening degree decrease control, when the throttle valve opening degree TA is zero immediately before the time t52 upon the satisfaction of the engine stop condition, the throttle valve opening degree TA is maintained at the throttle valve opening degree TA controlled immediately before the time t52.

In the example shown in FIG. 5, when the present control device executes the engine stop control, the vehicle speed SPD becomes zero at a time t53. Then, at a time t54, the engine rotation stops and the engine speed NE becomes zero.

As described above, the vehicle speed SPD has been already zero at the time t54 upon the stop of the engine rotation. Thus, no running noise and vibration is generated from the vehicle. However, the throttle valve opening degree TA is not increased and corresponds to a throttle valve opening degree controlled when the throttle valve 45 is fully closed. Thus, the noise and vibration generated from the engine 10 are small immediately before the time t54 upon the stop of the engine rotation. Therefore, even when the vehicle speed SPD has been already zero at the time t54 upon the stop of the engine rotation, the driver and the passengers of the vehicle are unlikely to be subject to a discomfort due to the noise and the vibration of the engine 10.

The summary of the engine stop control executed by the present control device has been described.

<Concrete Engine Stop Control by Control Device>

Next, the concrete engine stop control executed by the present control device will be described. When an engine stop condition described later is satisfied, that is, when a value of an engine stop request flag Xstp described later is "1" and a value of an engine start request flag Xrst described later is "0", the CPU of the ECU 80 is configured or programmed to execute an engine stop control routine shown by a flowchart in FIG. 6 every an elapse of a predetermined time period. It should be noted that the CPU executes a control for carrying out the fuel injections and the fuel ignitions normally when the engine stop condition described later is not satisfied, the fuel-cut condition described later is not satisfied and a value of an engine start completion flag Xss is "1", that is, the start of the engine operation has been completed.

Therefore, when the engine stop condition is satisfied and a predetermined timing comes, the CPU starts a process from a step 600 of FIG. 6 and then, sequentially executes processes of steps 610 to 615 described below.

Step 610: The CPU stops the fuel injections. In this case, the CPU sends no command signal to the fuel injectors 39.

Step 615: The CPU stops the fuel ignitions. In this case, the CPU sends no command signal to the ignition devices 35.

Then, the CPU proceeds with the process to a step 620 to determine whether or not the present vehicle speed SPD is equal to or larger than the second speed SPD2. When the vehicle speed SPD is equal to or larger than the second speed SPD2 upon the execution of the process of the step 620 by the CPU, the CPU determines "Yes" at the step 620 and then, sequentially executes processes of steps 625 to 640 described below. In other words, the CPU executes the opening degree increase control and the fuel pressure increase control.

Step 625: The CPU sets, as a target throttle valve opening degree TAtgt, a value obtained by adding a predetermined value dTA to a first opening degree TA1 (TAtgt=TA1+dTA=TAi).

In this example, the first opening degree TA1 is a throttle valve opening degree set as the target throttle valve opening degree TAtgt during the execution of the fuel-cut control described later shown in FIG. 9. In other words, in this example, the first opening degree TA1 is zero or the idling engine operation learned opening degree (see JP 2013-142334). Further, the predetermined value dTA is a positive value larger than zero. In this example, the predetermined value dTA is a value capable of causing the value obtained by adding the predetermined value dTA to the first opening degree TA1 to be a throttle valve opening degree TAmax of the fully-opened throttle valve 45.

Before the process of the step 625 is first executed, at least, the fuel-cut control described later is executed. Thus, the target throttle valve opening degree TAtgt is zero or the idling engine operation learned opening degree as described later. Therefore, according to the process of the step 625, the target throttle valve opening degree TAtgt is set to a value larger than the target throttle valve opening degree TAtgt set immediately before the engine stop condition is satisfied.

Step 630: The CPU sets a value of an opening degree increase flag Xth to "1". This opening degree increase flag Xth is a flag for indicating whether or not the increase of the throttle valve opening degree TA has been carried out, that is, the opening degree increase control is executed. In particular, when the value of the opening degree increase flag Xth is "1", the opening degree increase flag Xth indicates that the increase of the throttle valve opening degree TA has been carried out.

Step 635: The CPU sets, as a target fuel pressure PFtgt, a value obtained by adding a predetermined value dPF to the base fuel pressure PFb (PFtgt=PFb+dPF=PFi). In this example, each of the base fuel pressure PFb and the predetermined value dPF is a positive value larger than zero. In particular, the base fuel pressure PFb is a fuel pressure which has been set as the target fuel pressure PFtgt during the execution of a control other than the engine stop control.

Therefore, before the process of the step 635 is first executed, the target fuel pressure PFtgt is set to the base fuel pressure PFb. Thus, according to the process of the step 635, the target fuel pressure PFtgt is set to a value larger than the target fuel pressure PFtgt set immediately before the engine stop condition is satisfied.

Step 640: The CPU sends command signals to the throttle valve actuator 45*a* and the high pressure fuel pump 62, respectively such that the throttle valve opening degree TA and the fuel pressure PF are caused to correspond to the target throttle valve opening degree TAtgt and the target fuel pressure PFtgt set at the steps 625 and 635, respectively.

Thereby, the throttle valve opening degree TA and the fuel pressure PF are controlled to the target throttle valve opening degree TAtgt and the target fuel pressure PFtgt, respectively. Thus, the throttle valve opening degree TA and the fuel pressure PF are increased from the throttle valve opening degree TA and the fuel pressure PF, respectively controlled immediately before the engine stop condition is satisfied. In addition, since the fuel injection and the fuel ignition are not carried out, the engine speed NE gradually decreases. Then, as far as the engine start condition described later is not satisfied, the engine speed NE becomes zero over time and the engine rotation stops.

Then, the CPU proceeds with the process to a step 695 to terminate this routine once.

On the other hand, when the vehicle speed SPD is smaller than the second speed SPD2 upon the execution of the process of the step 620 by the CPU, the CPU determines "No" at the step 620 and then, sequentially executes processes of steps 645 to 660 described below.

Step 645: The CPU sets zero as a target throttle valve opening degree TAtgt.

Step 650: The CPU sets the value of the opening degree increase flag Xth to "0".

Step 655: The CPU sets the base fuel pressure PFb as a target fuel pressure PFtgt.

Step 660: The CPU sends command signals to the throttle valve actuator 45*a* and the high pressure fuel pump 62, respectively such that the throttle valve opening degree TA and the fuel pressure PF are caused to correspond to the target throttle valve opening degree TAtgt and the target fuel pressure PFtgt set at the steps 645 and 655, respectively.

Thereby, the throttle valve opening degree TA and the fuel pressure PF are controlled to the target throttle valve opening degree TAtgt and the target fuel pressure PFtgt, respectively. In this case, when the throttle valve opening degree TA is not zero immediately before the satisfaction of the engine stop condition, the throttle valve opening degree TA is decreased from the throttle valve opening degree TA controlled immediately before the satisfaction of the engine stop condition. Further, the fuel pressure PF is maintained at a fuel pressure PF controlled immediately before the satisfaction of the engine stop condition. In addition, since the fuel injection and the fuel ignition are not carried out, the engine speed NE gradually decreases. Thus, as far as the engine start condition described later is not satisfied, the engine speed NE becomes zero over time and the engine rotation stops.

The concrete engine stop control executed by the present control device has been described. According to this engine stop control, in case that the running noise and vibration are relatively small upon the stop of the engine rotation and thus, the driver and the passengers of the vehicle are unlikely to be subject to a discomfort derived from the noise and the vibration generated from the engine 10 due to the stop of the engine rotation, even when the engine stop condition is satisfied, the increase of the throttle valve opening degree TA, which leads to the increase of the noise and the vibration generated due to the stop of the engine rotation, is not carried out. Thus, when the engine stop control is executed and thus, the engine rotation stops, the driver and the passengers of the vehicle are unlikely to be subject to a discomfort.

<Entire Engine Operation Control by Control Device>

Next, the entire engine operation control of the engine 10 executed by the present control device will be described. The CPU of the ECU 80 is configured or programmed to execute an engine operation control routine shown by a flowchart in FIG. 7 every an elapse of a predetermined time period. Therefore, at a predetermined timing, the CPU starts a process from a step 700 and then, proceeds with the process to a step 710 to determine whether or not the value of the fuel-cut flag XFC is "1".

In this example, the value of the fuel-cut flag XFC is set to "1" when a fuel cut condition described below is satisfied.

The fuel-cut condition is satisfied when all of following conditions (1) to (5) are satisfied.

(1) The acceleration pedal operation amount Accp is zero.

(2) The engine speed NE is equal to or larger than a predetermined engine speed NEfc. Hereinafter, the predetermined engine speed NEfc will be referred to as "the fuel-cut engine speed NEfc".

(3) The value of the engine stop request flag Xstp is "0".

(4) The value of the engine start request flag Xrst is "0".

(5) The value of the engine start completion flag Xss is "1".

It should be noted that the details of the engine stop request flag Xstp, the engine start request flag Xrst and the engine start completion flag Xss will be described later.

The value of the fuel-cut flag XFC is set to "0" when a fuel supply restart condition described below is satisfied. The fuel supply restart condition is a condition for terminating the execution of the fuel-cut control and restarting the fuel injections.

The fuel supply restart condition is satisfied when any one of following conditions (1) to (5) is satisfied.

(1) The acceleration pedal operation amount Accp becomes larger than zero when the fuel-cut control is executed (i.e., when the value of the fuel-cut flag XFC is "1").

(2) The engine speed NE becomes equal to or smaller than a predetermined engine speed NErs when the fuel-cut control is executed. Hereinafter, this predetermined engine speed NErs will be referred to as "the engine operation restart engine speed NErs".

(3) The value of the engine stop request flag Xstp is set to "1".

(4) The value of the engine start request flag Xrst is set to "1".

(5) The value of the engine start completion flag Xss is set to "0".

The engine operation restart engine speed NErs is a value smaller than the fuel-cut engine speed NEfc and larger than the idling engine speed NEid. Further, the engine operation restart engine speed NErs is a lower limit value of the engine speed capable of converging the engine speed NE on the idling engine speed NEid without causing the engine speed NE to decreasing significantly to below the idling engine speed NEid if the fuel injections and the fuel ignitions are restarted when the engine speed NE decreases to the engine operation restart engine speed NErs.

When the value of the fuel-cut flag XFC is "0" upon the execution of the process of the step 710 by the CPU, the CPU determines "No" at the step 710 and then, proceeds with the process to a step 720 to determine whether or not the value of the engine stop request flag Xstp is "1" and the value of the engine start request flag Xrst is "0".

The value of the engine stop request flag Xstp is set to "1" when the engine stop condition is satisfied.

The value of the engine start request flag Xrst is set to "1" when the brake pedal 92 is released and the acceleration pedal 91 is depressed after the start of the engine stop control, that is, when a request of restarting the engine operation (i.e., an engine start request) is generated after the start of the engine stop control.

Now, it is assumed that the determination condition of the step 720 is not satisfied. In this case, the CPU determines "No" at the step 720 and then, proceeds with the process to a step 730 to determine whether or not the value of the engine stop request flag Xstp is "1" and the value of the engine start request flag Xrst is "1".

Now, it is assumed that the determination condition of the step 730 is not satisfied. In this case, the CPU determines "No" at the step 730 and then, proceeds with the process to execute a normal control routine shown by a flowchart in FIG. 8.

Therefore, when the CPU proceeds with the process to the step 740, the CPU start a process from a step 800 of FIG. 8 and then sequentially executes processes of steps 805 to 830 described below. Then, the CPU proceeds with the process to a step 795 of FIG. 7 via a step 895.

Step 805: The CPU applies the actual engine speed NE and the acceleration pedal operation amount Accp as a representative value of an actual engine load to a loolup table MapQFtgt(NE,Accp) to acquire a target injection amount QFtgt. According to this table MapQFtgt(NE,Accp), as the engine speed NE increases, the acquired target injection amount QFtgt decreases and as the acceleration pedal operation amount Accp increases, the acquired target injection amount QFtgt increases.

Step 810: The CPU applies the engine speed NE and the acceleration pedal operation amount Accp to a lookup table MapTFtgt(NE,Accp) to acquire a target injection timing TFtgt. According to this table MapTFtgt(NE,Accp), as the engine speed NE increases, the acquired target injection timing TFtgt advances and as the acceleration pedal operation amount Accp increases, the acquired target injection timing TFtgt advances.

Step 815: The CPU applies the engine speed NE and the acceleration pedal operation amount Accp to a lookup table MapTItgt(NE,Accp) to acquire a target ignition timing TItgt. According to this table MapTItgt(NE,Accp), as the engine speed NE increases, the acquired target ignition timing TItgt advances and as the acceleration pedal operation amount Accp increases, the acquired target ignition timing TItgt delays.

Step 820: The CPU applies the engine speed NE and the acceleration pedal operation amount Accp to a lookup table MapTAtgt(NE,Accp) to acquire a target throttle valve opening degree TAtgt. According to this table MapTAtgt(NE,Accp), as the engine speed NE increases, the acquired target throttle valve opening degree TAtgt increases and as the acceleration pedal operation amount Accp increases, the acquired target throttle valve opening degree TAtgt increases.

Step 825: The CPU sets a base fuel pressure PFb as a target fuel pressure PFtgt. The base fuel pressure PFb is a predetermined constant fuel pressure.

Step 830: The CPU sends command signals to the fuel injectors 39, the ignition devices 35, the throttle valve actuator 45a and the high pressure fuel pump 62 in accordance with the target injection amount QFtgt, the target injection timing TFtgt, the target ignition timing TItgt, the target throttle valve opening degree TAtgt and the target fuel pressure PFtgt set at the steps 805 to 825, respectively.

Thereby, while the throttle valve opening degree TA and the fuel pressure PF are controlled to the target throttle valve opening degree TAtgt and the target fuel pressure PFtgt, respectively, the target injection amount QFtgt of the fuel is injected from each of the fuel injectors 39 at the target injection timing TFtgt and then, the fuel is ignited by each of the ignition devices 35 at the target ignition timing TItgt.

Figure 9:
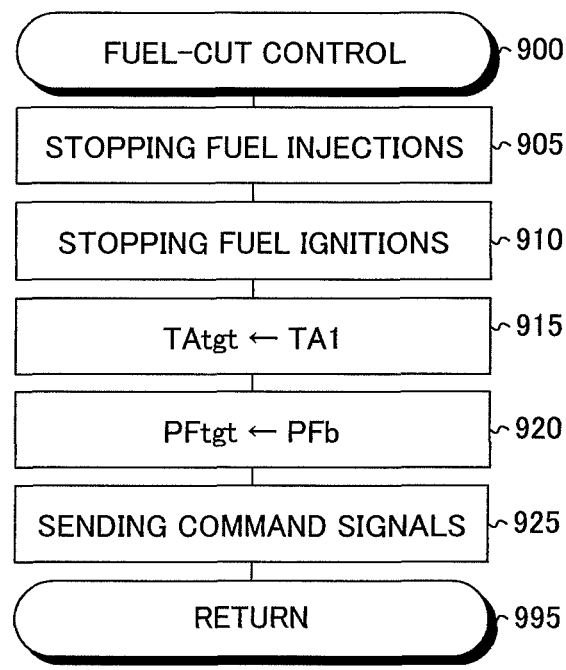
FIG. 9 shows a flow chart showing a fuel-cut control routine executed by the CPU shown in FIG. 1.

Again, referring to FIG. 7, when the value of the fuel-cut flag XFC is "1" upon the execution of the process of the step 710 by the CPU, the CPU determines "Yes" at the step 710 and then, proceeds with the process to a step 715 to execute a fuel-cut control routine shown by a flowchart in FIG. 9.

Therefore, when the CPU proceeds with the process to the step 715, the CPU starts a process from a step 900 of FIG. 9 and then, sequentially executes processes of steps 905 to 925 described below. Then, the CPU proceeds with the process to the step 795 of FIG. 7 via a step 995.

Step 905: The CPU stops the fuel injections. In this case, the CPU sends no command signal to the fuel injectors 39.

Step 910: The CPU stops the fuel ignitions. In this case, the CPU sends no command signal to the ignition devices 35.

Step 915: The CPU sets the first opening degree TA1 as a target throttle valve opening degree TAtgt.

Step 920: The CPU sets the base fuel pressure PFb as a target fuel pressure PFtgt.

Step 925: The CPU sends command signals to the throttle valve actuator 45a and the high pressure fuel pump 62 in accordance with the target throttle valve opening degree TAtgt and the target fuel pressure PFtgt set at the steps 915 and 920, respectively.

Thereby, the throttle valve opening degree TA is controlled to the target throttle valve opening degree TAtgt and the fuel pressure PF is controlled to the target fuel pressure PFtgt. As described above, in this case, the fuel injection and the fuel ignition are not carried out.

On the other hand, when the engine stop condition is satisfied and then, the value of the engine stop request flag Xstp changes to "1", the CPU determines "No" at the step 710 of FIG. 7 and "Yes" at the step 720 and then, proceeds with the process to a step 725 to execute the engine stop control routine described with reference to FIG. 6. As a result, when the vehicle speed SPD at this time is equal to or larger than the second speed SPD2, the throttle valve opening degree TA and the fuel pressure PF are increased from the throttle valve opening degree and the fuel pressure, respectively controlled immediately before the satisfaction of the engine stop condition. Further, since the fuel injection and the fuel ignition are not carried out, the engine speed NE gradually decreases. Thus, as far as the engine start condition is not satisfied, the engine speed NE becomes zero over time and the engine rotation stops.

When the engine stop control is started ant then, the engine start request is generated due to the release of the brake pedal 92 and the depression of the acceleration pedal 91, the value of the engine start request flag Xrst changes to "1". In this case, the CPU determines "No" at the steps 710 and 720 and "Yes" at the step 730 and then, proceeds with the process to a step 735 to execute an engine start control routine shown by a flowchart in FIG. 12 described later.

<Summary of Engine Start Control by Control Device>

Various operations realized by the engine start control routines will be described.

When the present control device determines that the engine start request is generated, the present control device starts the operation of the engine 10 by executing one of following controls (1) to (3) depending on the engine speed NE and whether or not the opening degree increase control is executed (the value of the opening degree increase flag Xth).

Figure 8:
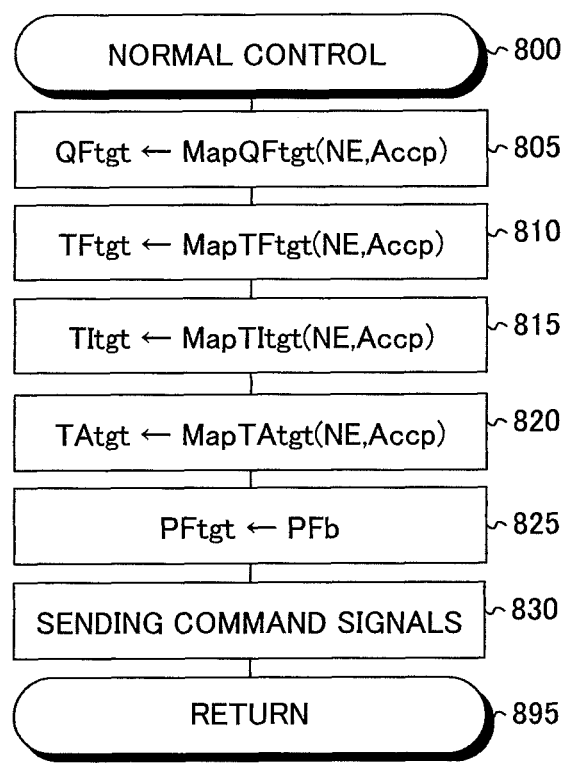
FIG. 8 shows a flow chart showing a normal control routine executed by the CPU shown in FIG. 1.

(1) The normal control shown in FIG. 8 (the control for carrying out the fuel injection in the latter half of the compression stroke and the fuel ignition at around the compression top dead center).

(2) The control for carrying out the fuel injection in the first half of the combustion stroke and the fuel ignition immediately after the fuel injection (the ignition engine start control).

(3) The control for carrying out the fuel injection in the latter half of the compression stroke and the fuel ignition immediately after the fuel injection while the starter motor 26 is activated (the starter engine start control).

In particular, when the engine speed NE upon the generation of the engine start request is equal to or larger than a first engine speed NE1 (NE≥NE1), the present control device determines that a normal engine start condition is satisfied and thus, starts the operation of the engine 10 by the execution of the normal control shown in FIG. 8.

On the other hand, when the engine speed NE upon the generation of the engine start request is smaller than the first engine speed NE1 and equal to or larger than a second engine speed NE2 smaller than the first engine speed NE1 (NE2≤NE<NE1) and the opening degree increase control is executed, that is, the value of the opening degree increase flag Xth is "1", the present control device determines that an ignition engine start condition is satisfied and thus, starts the operation of the engine 10 by the execution of the ignition engine start control.

In this example, the ignition engine start control is a control for carrying out the fuel injection in the first half of the combustion stroke and the fuel ignition immediately after the fuel injection in a cylinder, the crank angle of which is in the first half of the combustion stroke, for example, between 10 degree crank angle after the compression top dead center and 30 degree crank angle after the compression top dead center or in a cylinder, the crank angle of which first moves into the first half of the combustion stroke after the satisfaction of the engine start condition.

On the other hand, when the engine speed NE upon the generation of the engine start request is smaller than the first engine speed NE1 and equal to or larger than the second engine speed NE2 (NE2≤NE<NE1) and the opening degree increase control is not executed, that is, the value of the opening degree increase flag Xth is "0", the present control device determines that the ignition engine start condition is not satisfied. Then, when the engine speed NE decreases to below a third engine speed NE3 smaller than the second engine speed NE2, the present control device determines that the starter engine start condition is satisfied and then, starts the operation of the engine 10 by the execution of the starter engine start control.

Also, when the engine speed NE upon the generation of the engine start request is smaller than the second engine speed NE2 (NE<NE2) and then, decreases to below the third engine speed NE3 smaller than the second engine speed NE2, the present control device determines that the starter engine start condition is satisfied and thus, starts the operation of the engine 10 by the execution of the starter engine start control.

The case of starting the operation of the engine 10 by the execution of the ignition engine start control will be described with reference to FIG. 10. In an example shown in FIG. 10, the contents including the control until a time t102 upon the satisfaction of the engine stop condition are the same as the contents including the control until the time t32 upon the satisfaction of the engine stop condition in the example shown in FIG. 3.

Figure 10:
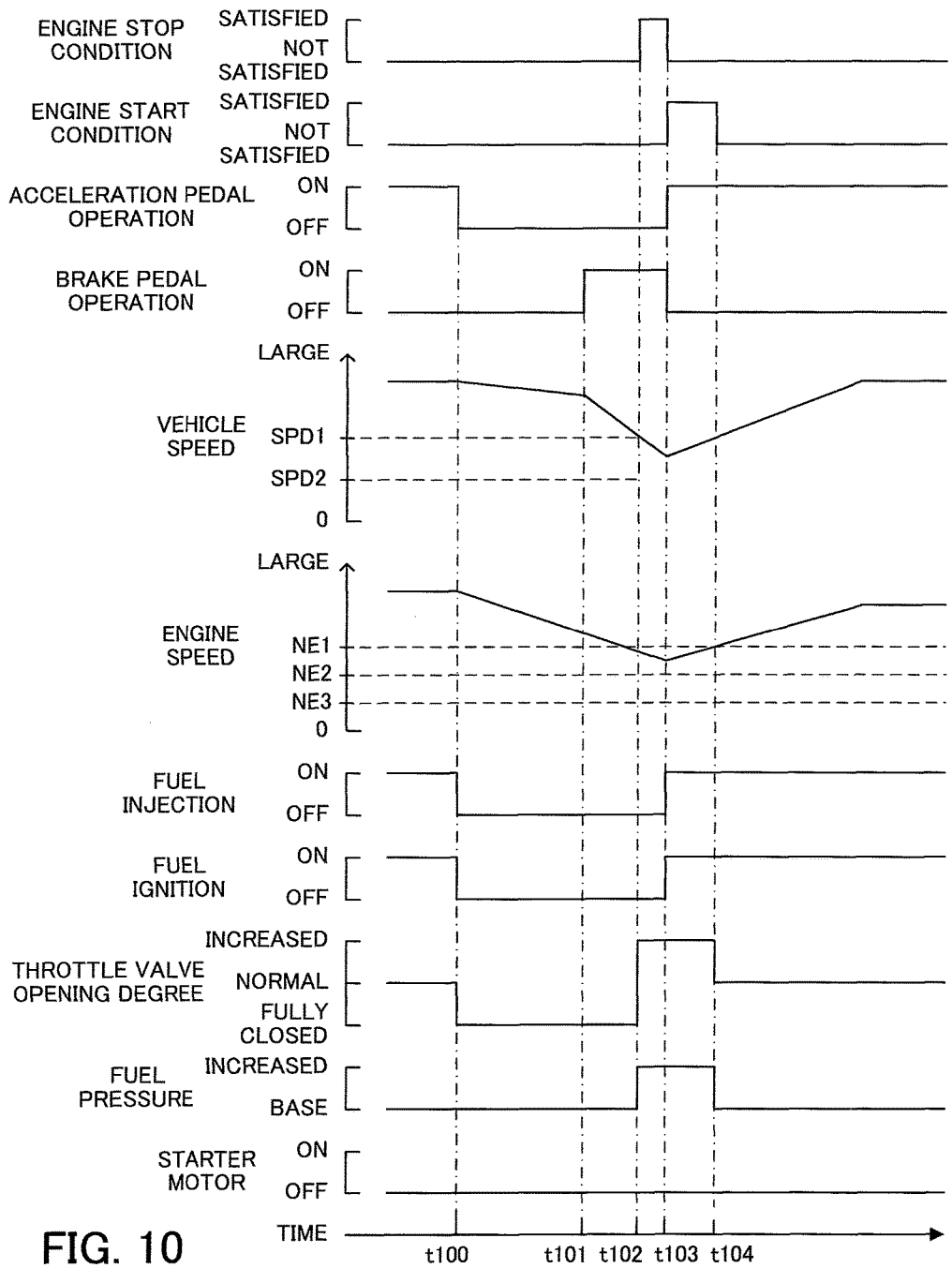
FIG. 10 shows a time chart used for describing an engine start control (in particular, a start of an operation of the engine by an ignition engine start control) executed by the control device according to the embodiment.

In the example shown in FIG. 10, at the time t102 upon the satisfaction of the engine stop condition, the opening degree increase control and the fuel pressure increase control are started. Then, at a time t103, the brake pedal 92 is released and the acceleration pedal 91 is depressed. Thus, the engine start request is generated. At this time, the engine speed NE is smaller than the first engine speed NE1 and equal to or larger than the second engine speed NE2 (NE2≤NE<NE1) and the throttle valve opening degree TA is increased, that is, the opening degree increase control has been executed. Therefore, the present control device determines that the ignition engine start condition is satisfied and thus, starts the ignition engine start control for carrying out the fuel injection in the first half of the combustion stroke and the fuel ignition immediately after the fuel injection.

In this example, the second engine speed NE2 is a lower limit value of the engine speed NE capable of applying a sufficient rotation torque to the crank shaft 24 to increase the engine speed NE by executing the ignition engine start control for carrying out the fuel injection in the first half of the combustion stroke and the fuel ignition immediately after the fuel injection.

In the example shown in FIG. 10, the engine speed NE upon the generation of the engine start request is equal to or larger than the second engine speed NE2. Thus, the engine speed NE can be increased by executing the ignition engine start control to carry out the fuel injection and the fuel ignition. Therefore, after the time t103, the engine speed NE increases.

Further, in this example, after the satisfaction of the engine stop condition, the throttle valve opening degree TA has been increased. Thus, an amount of air in the combustion chamber 25 in the combustion stroke is relatively large. In addition, after the satisfaction of the engine stop condition, the fuel pressure PF has been increased. Thus, the fuel injector 39 can inject an amount for fuel sufficient for rotating the crank shaft 24. Therefore, the fuel can be assuredly burned in the ignition engine start control. As a result, the operation of the engine 10 can be assuredly started.

Therefore, after the time t103, the engine speed NE increases. At a time t104, the engine speed NE reaches the first engine speed NE1 (i.e., an engine start completion engine speed) and thus, the start of the operation of the engine 10 is completed.

It should be noted that in this example, the first engine speed NE1 is a lower limit value of the engine speed NE capable of applying a rotation torque to the crank shaft 24 to increase the engine speed NE by carrying out the fuel injection and the fuel ignition in accordance with the normal control routine shown in FIG. 8. Further, in this example, the first engine speed NE1 is an engine speed NE for determining whether or not the start of the operation of the engine 10 is completed (for example, 600 rpm).

The summary of the engine start realized by the ignition engine start control has been described.

Next, with reference to FIG. 11, there will be described a case of starting the operation of the engine 10 by the execution of the starter engine start control when the engine speed NE upon the generation of the engine start request is smaller than the first engine speed NE1 and equal to or larger than the second engine speed NE2.

Figure 11:
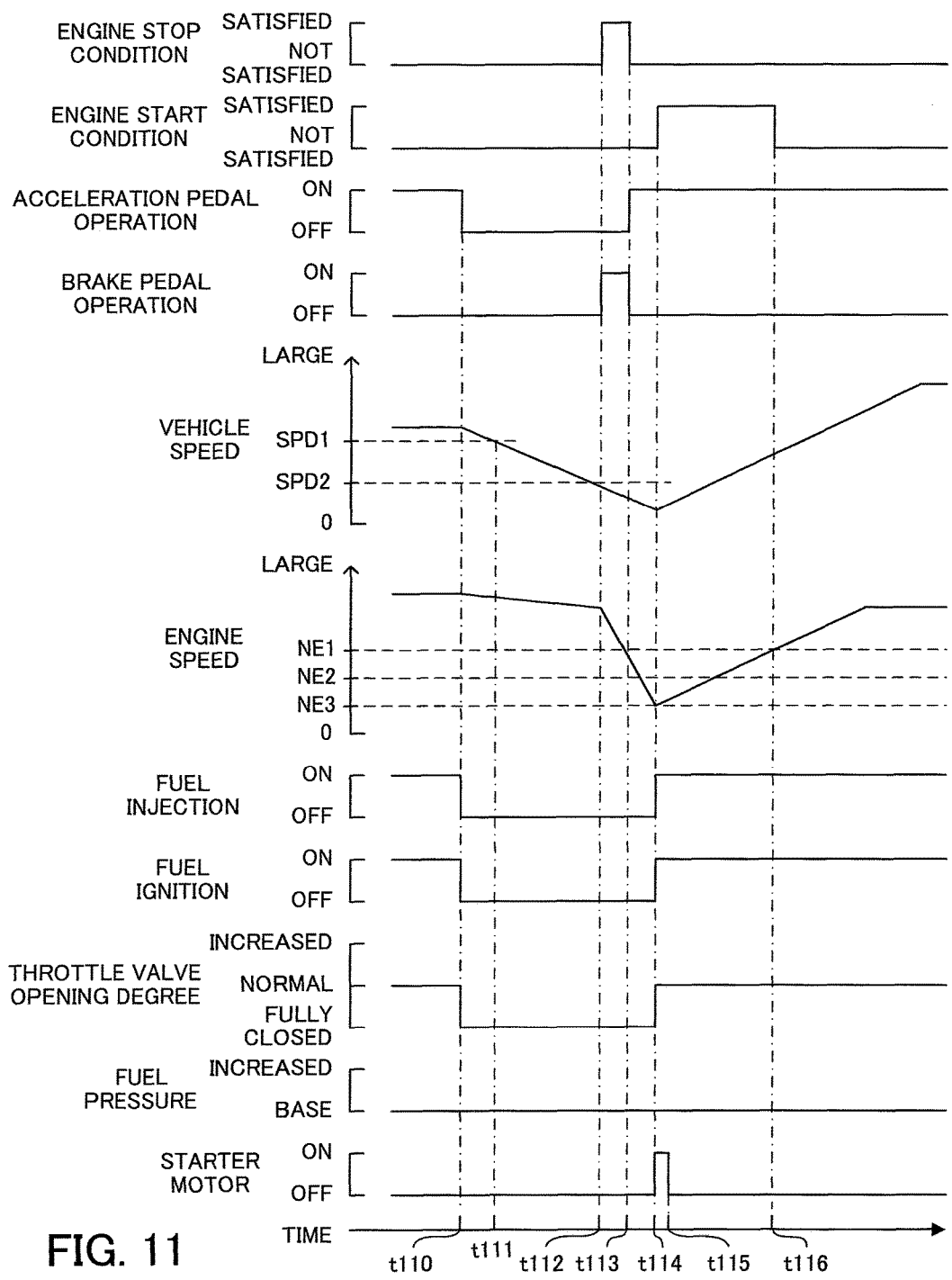
FIG. 11 shows a time chart used for describing an engine start control (in particular, a start of the operation of the engine by a starter engine start control) executed by the control device according to the embodiment.

In an example shown in FIG. 11, at a time t112, the engine stop condition is satisfied. At this time, the vehicle speed SPD is smaller than the second speed SPD2. Thus, the opening degree increase control and the fuel pressure increase control are not executed.

Then, in this example, at a time t113, the brake pedal 92 is released and the acceleration pedal 91 is depressed. Thus, the engine start request is generated. At this time, the engine speed NE is equal to or smaller than the first engine speed NE1 and larger than the second engine speed NE2. However, since the throttle valve opening degree TA has not been increased, that is, the opening degree increase control has not been executed, the ignition engine start condition is not satisfied. Therefore, the present control device does not start the ignition engine start control.

Then, at a time t114, the engine speed NE decreases to the third engine speed NE3. At this time, the starter engine start condition is satisfied. Therefore, the present control device starts the starter engine start control.

In particular, the present control device activates the starter motor 26 to mesh the pinion gear 26a with the ring gear 27 secured to the crank shaft 24, thereby to apply a rotation torque to the crank shaft 24 via the ring gear 27 and carries out the fuel injection in the latter half of the compression stroke and the fuel ignition immediately after the fuel injection.

It should be noted that the starter motor 26 of this embodiment is a starter motor, the pinion gear 26a of which cannot appropriately meshes with the ring gear 27 secured to the crank shaft 24 when the engine speed NE is larger than the third engine speed NE3. Therefore, the third engine speed NE3 is an upper limit value of the engine speed NE capable of meshing the pinion gear 26a of the starter motor 26 with the ring gear 27 appropriately.

Therefore, when the engine speed NE is equal to or smaller than the third engine speed NE3, the engine speed NE can be increased by executing the starter engine start control to carry out the fuel injection and the fuel ignition as well as mesh the pinion gear 26a of the starter motor 26 with the ring gear 27 to rotate the crank shaft 24.

In the example shown in FIG. 11, the engine speed NE corresponds to the third engine speed NE3 at a time t114 upon the satisfaction of the starter engine start condition. Thus, at this time, the engine speed NE can be increased by the execution of the starter engine start control. Therefore, after the time t114, the engine speed NE increases. Then, at a time t116, the engine speed NE reaches the first engine speed NE1 (i.e., the engine start completion engine speed) and thus, the start of the operation of the engine 10 is completed.

It should be noted that when the engine speed NE increases to a constant engine speed at a time t115, the activation of the starter motor 26 is stopped.

The summary of the engine start realized by the execution of the starter engine start control has been described.

<Concrete Engine Start Control by Control Device>

Next, the concrete engine start control executed by the present control device will be described. As described above, when the CPU determines "Yes" at the step 730, the CPU proceeds with the process to the step 735 to execute the engine start control shown by a flowchart in FIG. 12.

Figure 12:
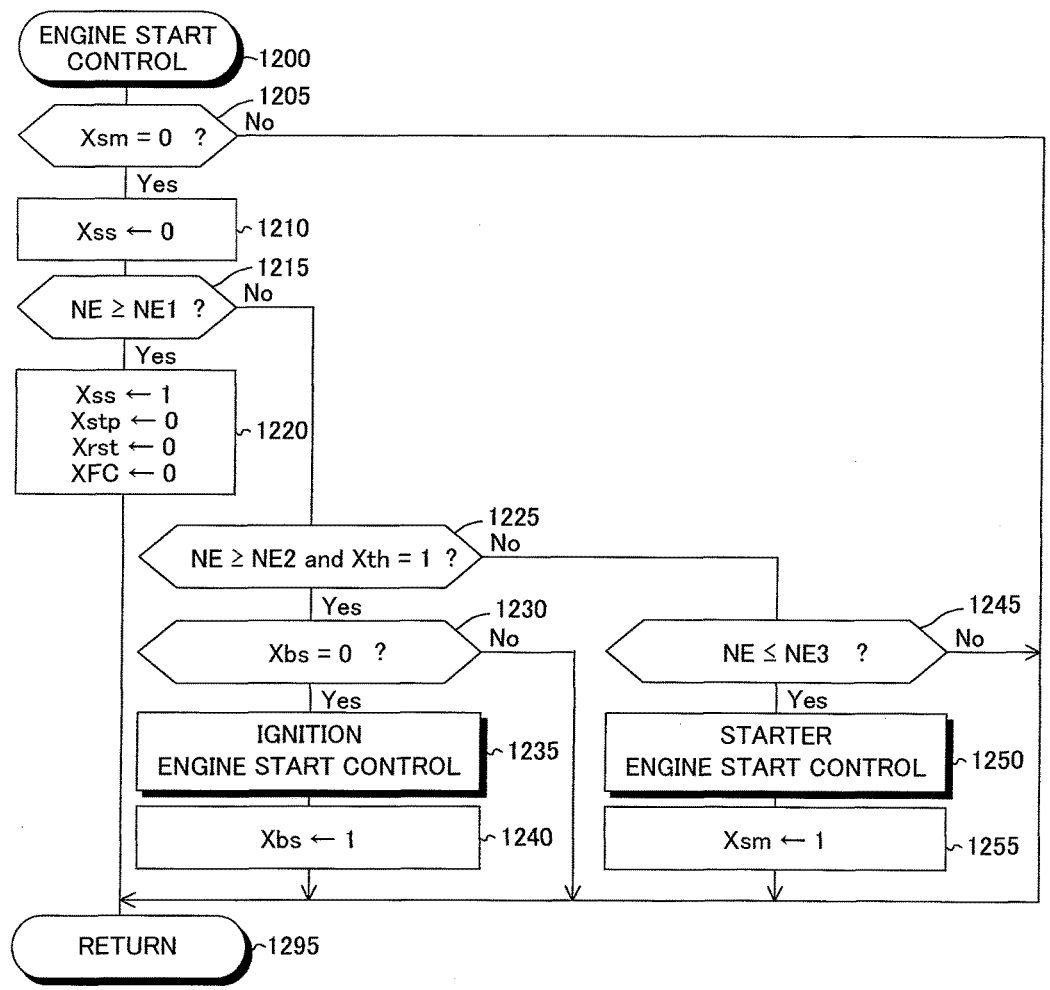
FIG. 12 shows a flow chart showing an engine start control routine executed by the CPU shown in FIG. 1.

Therefore, at a predetermined timing, the CPU starts a process from a step 1200 of FIG. 12 and then, proceeds with the process to a step 1205 to determine whether or not the value of the starter engine start flag Xsm is "0". As described later, when the starter engine start control is started, the value of the starter engine start flag Xsm is set to "1".

Therefore, at the present time, the value of the starter engine start flag Xsm is "0". Thus, the CPU determines "Yes" at the step 1205 and then, proceeds with the process to a step 1210 to set the value of the engine start completion flag Xss to "0". It should be noted that when the value of the starter engine start flag Xsm is "1", the CPU determines "No" at the step 1205 and then, proceeds with the process to the step 795 of FIG. 7 via a step 1295.

When the CPU proceeds with the process to the step 1215, the CPU determines whether or not the engine speed NE is equal to or larger than the first engine speed NE1. When the engine speed NE is equal to or larger than the first engine speed NE1, the CPU determines "Yes" at the step 1215 and then, proceeds with the process to a step 1220 to execute following processes (1) to (4). Then, the CPU proceeds with the process to the step 795 of FIG. 7 via the step 1295.

(1) The CPU sets the value of the engine start completion flag Xss to "1". In other words, the CPU determines that the engine start has been completed.

(2) The CPU sets the value of the engine stop request flag Xstp to "0".

(3) The CPU sets the engine start request flag Xrst to "0".

(4) The CPU sets the value of the fuel-cut flag XFC to "0".

Figure 7:
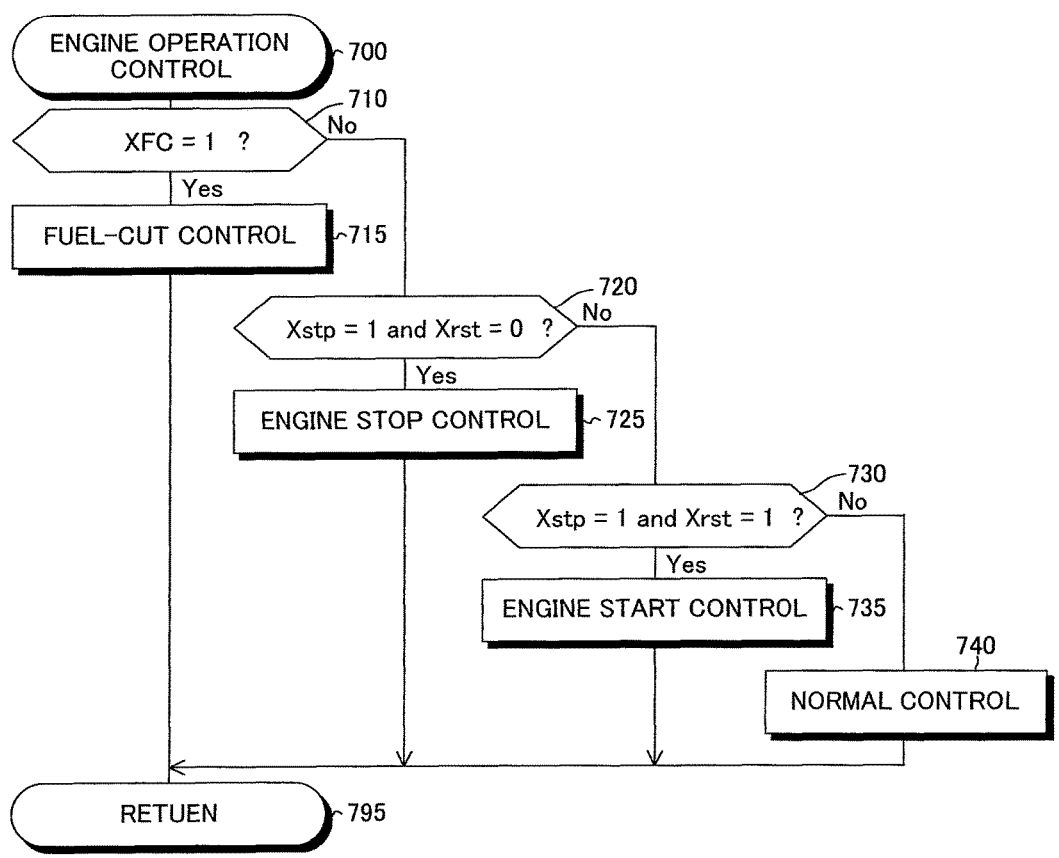
FIG. 7 shows a flow chart showing an engine operation control routine executed by the CPU shown in FIG. 1.

As a result, when the CPU starts the process of the routine shown in FIG. 7 next time, the CPU determines "No" at the steps 710, 720 and 730, respectively and then, proceeds with the process to the step 740. As a result, the start of the engine operation is realized by the execution of the normal control.

On the other hand, when the engine speed NE is smaller than the first engine speed NE1 upon the execution of the process of the step 1215, the CPU determines "No" at the step 1215 and then, proceeds with the process to a step 1225 to determine whether or not the engine speed NE is equal to or larger than the second engine speed NE2 and the value of the opening degree increase flag Xth is "1".

When the engine speed NE is equal to or larger than the second engine speed NE2 and the value of the opening degree increase flag Xth is "1" upon the execution of the process of the step 1225 by the CPU, the CPU determines "Yes" at the step 1225 and then, proceeds with the process to a step 1230 to determine whether or not the value of the ignition engine start flag Xbs is "0". As described later, when the ignition engine start control is started, the value of the ignition engine start flag Xbs is set to "1".

Therefore, at the present time, the value of the ignition engine start flag Xbs is "0". Thus, the CPU determines "Yes" at the step 1230 and then, proceeds with the process to a step 1235 to execute an ignition engine start control routine shown by a flowchart in FIG. 13. It should be noted that when the value of the ignition engine start flag Xbs is "1" upon the execution of the process of the step 1230 by the CPU, the CPU determines "No" at the step 1230 and then, proceeds with the process to the step 795 of FIG. 7 via the step 1295.

Figure 13:
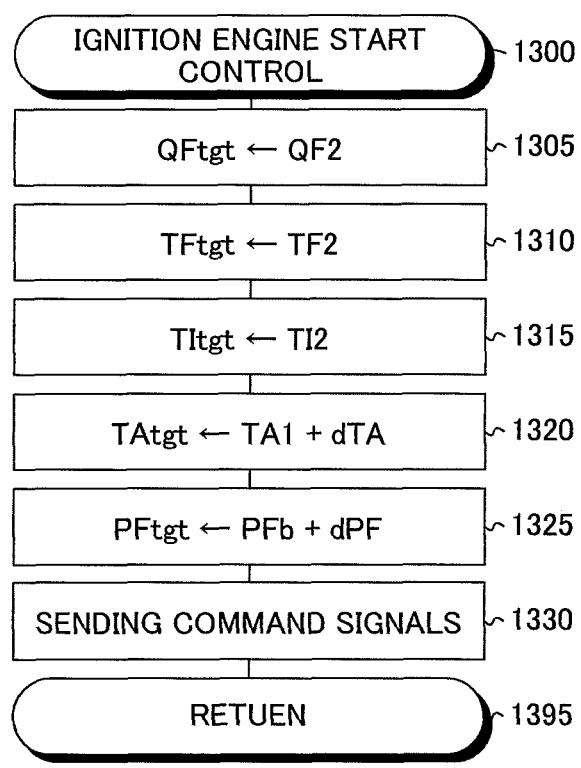
FIG. 13 shows a flow chart showing an ignition engine start control routine executed by the CPU shown in FIG. 1.

When the CPU proceeds with the process to the step 1235, the CPU starts a process from a step 1300 of FIG. 13 and then, sequentially executes processes of steps 1305 to 1330 described below. Then, the CPU proceeds with the process to the step 1240 of FIG. 12 via a step 1395.

Step 1305: The CPU sets a second injection amount QF2 as a target injection amount QFtgt. The second injection amount QF2 is acquired in advance by an experiment and is stored in the ROM of the ECU 80. It should be noted that the second injection amount QF2 may be a value which increases as the cooling water temperature THW decreases.

Step 1310: The CPU sets a second injection timing TF2 as a target injection timing TFtgt. The second injection timing TF2 is a timing in the first half of the combustion stroke of the cylinder, in which the ignition engine start control is executed. In particular, the second injection timing TF2 is acquired in advance by an experiment and is stored in the ROM of the ECU 80.

Step 1315: The CPU sets a second ignition timing TI2 as a target ignition timing TItgt. The second ignition timing TI2 is a timing immediately after the second injection timing TF2 set as a target injection timing TFtgt at the step 1310. In particular, the second ignition timing TI2 is acquired in advance by an experiment and is stored in the ROM of the ECU 80.

Step 1320: The CPU sets, as a target throttle valve opening degree TAtgt, a value obtained by adding a predetermined value dTA to the first opening degree TA1 (TAtgt=TA1+dTA).

Figure 6:
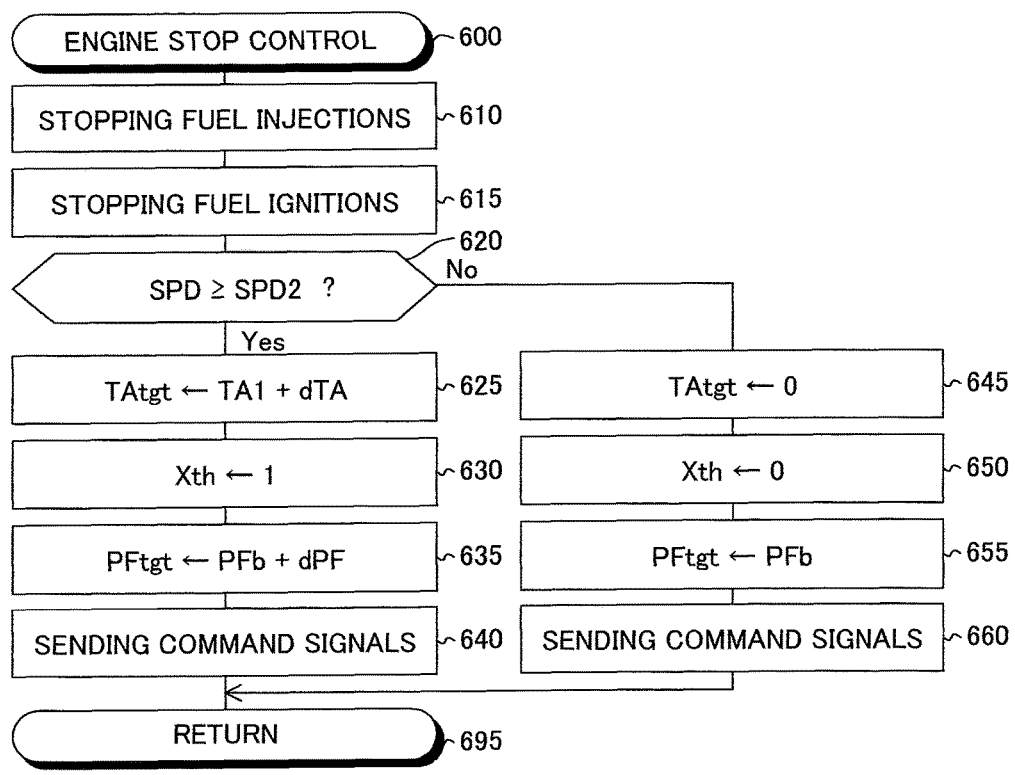
FIG. 6 shows a flow chart showing an engine stop control routine executed by a CPU shown in FIG. 1.

It should be noted that when this routine is executed, the value of the opening degree increase flag Xth is "1" (see the step 1225 of FIG. 12) and the target throttle valve opening degree TAtgt has been set to an opening degree larger than the first opening degree TA1 by the predetermined value dTA (see the step 625 of FIG. 6). Therefore, according to the process of the step 1320, the target throttle valve opening degree TAtgt is maintained at the target throttle valve opening degree TAtgt which had been set by the execution of the engine stop control until the satisfaction of the ignition engine start condition.

Step 1325: The CPU sets, as a target fuel pressure PFtgt, a value obtained by adding a predetermined value dPF to the base fuel pressure PFb (PFtgt=PFb+dPF).

It should be noted that as described above, when this routine is executed, the value of the opening degree increase flag Xth is "1" (see the step 1225 of FIG. 12) and the target fuel pressure PFtgt has been set to a value larger than the base fuel pressure PFb by the predetermined value dPF (see the step 635 of FIG. 6). Therefore, according to the process of the step 1325, the target fuel pressure PFtgt is maintained at the target fuel pressure PFtgt which has been set by the engine stop control executed until the satisfaction of the ignition engine start condition.

Step 1330: The CPU sends command signals to the fuel injector 39, the ignition device 35, the throttle valve actuator 45a and the high pressure fuel pump 62, respectively in accordance with the target injection amount QFtgt, the target injection timing TFtgt, the target ignition timing TItgt, the target throttle valve opening degree TAtgt and the target fuel pressure PFtgt set at the steps 1305 to 1325, respectively.

Thereby, while the throttle valve opening degree TA and the fuel pressure PF are controlled to the target throttle valve opening degree TAtgt and the target fuel pressure PFtgt, respectively, the target injection amount QFtgt of the fuel is injected from the fuel injector 39 at the target injection timing TFtgt corresponding to a timing in the first half of the combustion stroke and the fuel is ignited by the ignition device 35 at the target ignition timing TItgt corresponding to a timing immediately after the fuel injection.

Then, the CPU proceeds with the process to the step 1240 of FIG. 12 via a step 1395 to set the value of the ignition engine start flag Xbs to "1". Therefore, when the CPU proceeds with the process to the step 1230 next time, the CPU does not execute the process of the step 1235. Thus, the ignition engine start control is not executed.

Then, the CPU proceeds with the process to the step 795 of FIG. 7 via the step 1295.

On the other hand, when the engine speed NE is smaller than the second engine speed NE2 or the value of the opening degree increase flag Xth is "0" upon the execution of the process of the step 1225 of FIG. 12, the CPU determines "No" at the step 1225 and then, proceeds with the process to a step 1245 to determine whether or not the engine speed NE is equal to or smaller than the third engine speed NE3.

When the engine speed NE is larger than the third engine speed NE3 upon the execution of the process of the step 1245 by the CPU, the CPU determines "No" at the step 1245 and then, proceeds with the process to the step 795 of FIG. 7 via the step 1295.

Figure 14:
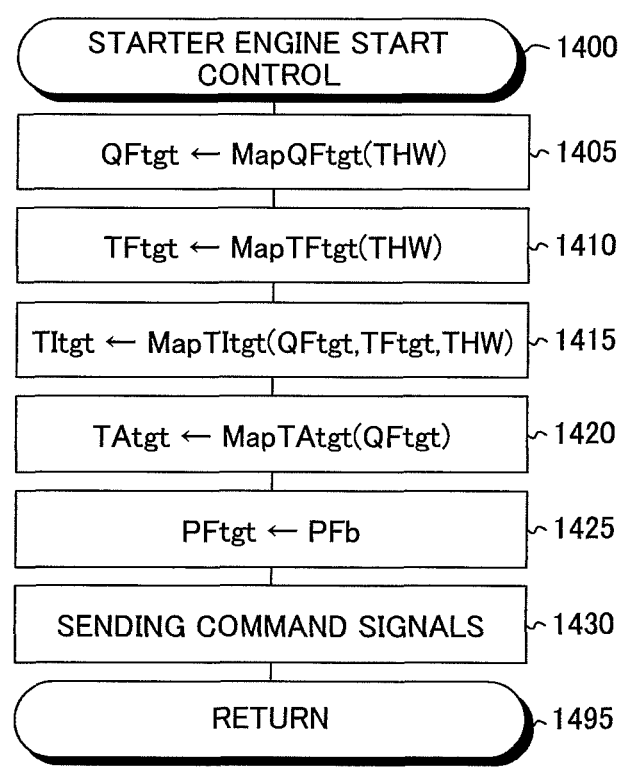
FIG. 14 shows a flow chart showing a starter engine start control routine executed by the CPU shown in FIG. 1.

On the other hand, when the engine speed NE is equal to or smaller than the third engine speed NE3 upon the execution of the process of the step 1245 by the CPU, the CPU determines "Yes" at the step 1245 and then, proceeds with the process to a step 1250 to execute a starter engine start control routine shown by a flowchart in FIG. 14.

Therefore, when the CPU proceeds with the process to the step 1250, the CPU starts a process from a step 1400 and then, sequentially executes processes of steps 1405 to 1430 described below. Then, the CPU proceeds with the process to a step 1255 of FIG. 12 via a step 1495.

Step 1405: The CPU applies the cooling water temperature THW to a lookup table MapQFtgt(THW) to acquire a target injection amount QFtgt. According to this table MapQFtgt(THW), as the cooling water temperature THW increases, the acquired target injection amount QFtgt decreases. In particular, as the cooling water temperature THW increases, the temperature of the combustion chamber 25 increases. Thus, the injected fuel is likely to vaporize and a sufficient explosion can be obtained by a small amount of the injected fuel. For this reason, as the cooling water temperature THW increases, the acquired target injection amount QFtgt decreases.

Step 1410: The CPU applies the cooling water temperature THW to a lookup table MapTFtgt(THW) to acquire a target injection timing TFtgt. According to this table MapT-Ftgt(THW), as the cooling water temperature THW increases, the acquired target injection timing TFtgt delays toward the compression top dead center in the latter half of the compression stroke. In particular, as the cooling water temperature THW increases, the temperature of the combustion chamber 25 increases. Thus, a time necessary for the injected fuel to sufficiently vaporize decreases. For this reason, as the cooling water temperature THW increases, the acquired target injection timing TFtgt delays toward the compression top dead center in the latter half of the compression stroke.

Step 1415: The CPU applies the target injection amount QFtgt and the target injection timing TFtgt acquired at the steps 1405 and 1410, respectively and the cooling water temperature THW to a lookup table MapTItgt(QFtgt,TFtgt,THW) to acquire a target ignition timing TItgt. According to this table MapTItgt(QFtgt,TFtgt,THW), as the target injection amount QFtgt increases, the acquired target ignition timing TItgt delays and as the target injection timing TFtgt advances, the acquired target ignition timing TItgt advances. Further, as the cooling water temperature THW increases, the acquired target ignition timing TItgt advances.

In particular, as the fuel injection amount increases, a time necessary for the fuel to sufficiently vaporize increases. For this reason, as the target injection amount QFtgt increases, the acquired target ignition timing TItgt delays.

Further, as the target injection timing TFtgt advances, a timing of the sufficient vaporization of the fuel advances. For this reason, as the target injection timing TFtgt advances, the acquired target ignition timing TItgt advances.

Furthermore, as the cooling water temperature THW increases, a time necessary for the fuel to sufficiently vaporize decreases. For this reason, as the cooling water temperature THW increases, the acquired target injection timing TFtgt advances.

Step 1420: The CPU applies the target injection amount QFtgt to a lookup table MapTAtgt(QFtgt) to acquire a target throttle valve opening degree TAtgt. According to this table MapTAtgt(QFtgt), the acquired target throttle valve opening degree TAtgt corresponds to a value capable of causing an air-fuel ratio of a mixture gas formed in the cylinders to be a predetermined air-fuel ratio. In this example, this predetermined air-fuel ratio is smaller (i.e., richer) than the stoichiometric air-fuel ratio. Further, as the target injection amount QFtgt increases, the acquired target throttle valve opening degree TAtgt increases.

Step 1425: The CPU sets the base fuel pressure PFb as a target fuel pressure PFtgt.

Step 1430: The CPU sends command signals to the fuel injectors 39, the ignition devices 35, the throttle valve actuator 45a and the high pressure fuel pump 62, respectively in accordance with the target injection amount QFtgt, the target injection timing TFtgt, the target ignition timing TItgt, the target throttle valve opening degree TAtgt and the target fuel pressure PFtgt set at the steps 1405 to 1425, respectively.

Thereby, while the throttle valve opening degree TA and the fuel pressure PF are controlled to the target throttle valve opening degree TAtgt and the target fuel pressure PFtgt, respectively and a rotation torque is applied to the crank shaft 24 by the starter motor 26, the target injection amount QFtgt of the fuel is injected from each of the fuel injectors 39 at the target injection timing TFtgt corresponding to a timing in the latter half of the compression stroke and the fuel is ignited by each of the ignition devices 35 at the target ignition timing TItgt corresponding to a timing around the compression top dead center immediately after the fuel injection.

Then, the CPU proceeds with the process to the step 1255 of FIG. 12 via the step 1495 to set the value of the starter engine start flag Xsm to "1".

Then, the CPU proceeds with the process to the step 795 of FIG. 7 via the step 1295.

<Engine Start Completion Determination by Control Device>

Figure 15:
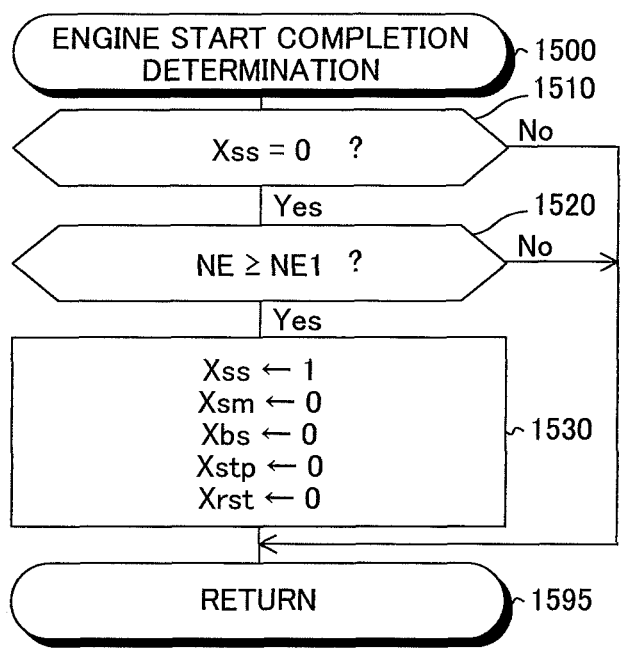
FIG. 15 shows a flow chart showing an engine start completion determination routine executed by the CPU shown in FIG. 1.

Further, the CPU is configured or programmed to execute an engine start completion determination control routine shown by a flowchart in FIG. 15 every an elapse of a predetermined time period. Therefore, at a predetermined timing, the CPU starts a process from a step 1500 of FIG. 15 and then, proceeds with the process to a step 1510 to determine whether or not a value of an engine start completion flag Xss is "0". The engine start completion flag Xss is a flag for indicating whether or not the start of the engine operation is completed after the satisfaction of the engine start condition. In particular, the value of the engine start completion flag Xss is "0", the engine start completion flag Xss indicates that the start of the engine operation is not completed.

When the value of the engine start completion flag Xss is "1" upon the execution of the process of the step 1510 by the CPU, the CPU determines "No" at the step 1510 and then, proceeds with the process to a step 1595 to terminate this routine once.

On the other hand, when the value of the engine start completion flag Xss is "0" upon the execution of the process of the step 1510 by the CPU, the CPU determines "Yes" at the step 1520 and then, proceeds with the process to a step 1520 to determine whether or not the engine speed NE is equal to or larger than the first engine speed NE1. When the engine speed NE is equal to or larger than the first engine speed NE1, it can be determined that the start of the engine operation is completed. Therefore, in this case, the CPU determines "Yes" at the step 1520 and then, proceeds with the process to a step 1530 to execute following processes (1) to (5). Then, the CPU proceeds with the process to a step 1595 to terminate this routine once.

(1) The CPU sets the value of the engine start completion flag Xss to "1".

(2) The CPU sets the value of the starter engine start flag Xsm to "0".

(3) The CPU sets the value of the ignition engine start flag Xbs to "0".

(4) The CPU sets the value of the engine stop request flag Xstp to "0".

(5) The CPU sets the value of the engine start request flag Xrst to "0".

As a result, thereafter, the CPU proceeds with the process to the step 740 of FIG. 7. Thus, the normal control is executed.

It should be noted that the present invention is not limited to the embodiment and various modifications can be employed within the scope of the present invention. For example, in the engine stop control according to the embodiment, at least one of following conditions (1) to (7) may be employed as a condition for executing the opening degree increase control (i.e., a first opening degree control) for increasing the throttle valve opening degree TA.

(1) The vehicle speed SPD upon the satisfaction of the engine stop condition is equal to or larger than the second speed SPD2.

(2) A strength of the wind around the vehicle upon the satisfaction of the engine stop condition is equal to or larger than a predetermined strength.

(3) A rainfall amount per unit time around the vehicle upon the satisfaction of the engine stop condition is equal to or larger than a predetermined amount.

(4) A window of the vehicle is open when the engine stop condition is satisfied.

(5) A windshield wiper of the vehicle is operated when the engine stop condition is satisfied.

(6) A fan of an air conditioner of the vehicle is operated when the engine stop condition is satisfied.

(7) A direction indicator of the vehicle is operated when the engine stop condition is satisfied.

When the strength of the wind around the vehicle is used as a parameter for determining whether or not a condition for executing the opening degree increase control is satisfied, a wind force sensor is provided on an outer wall of the vehicle. The strength of the wind around the vehicle is acquired on the basis of a signal output from the wind force sensor.

When the rainfall amount per unit time around the vehicle is used as a parameter for determining whether or not a condition for executing the opening degree increase control is satisfied, a rainfall meter is provided on the outer wall of the vehicle. The rainfall amount per unit time around the vehicle is acquired on the basis of a signal output from the rainfall meter.

When a state of the window of the vehicle, or an operation state of the windshield wiper of the vehicle, or an operation state of the fan of the air conditioner of the vehicle, or an operation state of the direction indicator of the vehicle is used as a parameter for determining whether or not a condition for executing the opening degree increase control is satisfied, the state of the window of the vehicle, or the operation state of the windshield wiper of the vehicle, or the operation state of the fan of the air conditioner of the vehicle, or the operation state of the direction indicator of the vehicle is acquired on the basis of information from a control device for controlling the window or the windshield wiper or the fan of the air conditioner or the direction indicator of the vehicle.

In other words, when satisfied is a particular condition for predicting that a level of the noise and/or vibration generated in an interior of the vehicle from a source other than the engine 10 is equal to or larger than a predetermined level upon the stop of the engine rotation by the execution of the engine stop control, the control device according to the embodiment may execute the opening degree increase control (i.e., the first opening degree control). On the other hand, when the particular condition is not satisfied, the control device according to the embodiment may execute the opening degree decrease control (i.e., the second opening degree control).

Further, the present invention can be broadly applied to an internal combustion engine which is configured to stop the engine rotation when the state of an ignition switch of the vehicle corresponds to an on-state.

Further, in the engine stop control according to the embodiment, instead of the opening degree decrease control, there may be executed a control (a second opening degree control) for increasing the throttle valve opening degree TA to an opening degree larger than the throttle valve opening degree TA controlled immediately before the start of the engine stop control and smaller than the throttle valve opening degree TAi increased by the execution of the opening degree increase control.

Further, in the engine stop control according to the embodiment, instead of the opening degree decrease control, there may be executed a control (a second opening degree control) for maintaining the throttle valve opening degree TA at the throttle valve opening degree TA controlled immediately before the start of the engine stop control.

Further, in the engine start control according to the embodiment, when the opening degree increase control is not executed upon the generation of the engine start request, the engine operation may be started by the execution of a control other than the starter engine start control, for example, by the execution of the ignition engine start control.

Further, when the starter motor 26 is a starter motor capable of applying a rotation torque to the crank shaft 24 independently of the engine speed NE, in the engine start control according to the embodiment, the engine operation may be started by quickly activating the starter motor 26 and starting the fuel injection and the fuel ignition before the engine speed NE decreases to the third engine speed NE3. In other words, in the engine start control according to the embodiment, the engine speed NE upon the generation of the engine start request may be omitted from the starter engine start condition.

Further, in the engine stop control according to the embodiment, when the vehicle speed SPD is smaller than the second speed SPD2 upon the satisfaction of the engine stop condition, at least one of following processes (1) to (6) may be employed as a process for promptly stopping the engine rotation.

(1) A process for controlling the throttle valve opening degree TA to zero.

(2) A process for controlling timings of opening and closing the intake valves 32 and the exhaust valves 34 to timings capable of increasing a pumping loss, respectively. For example, a process for closing the intake valves 32 and opening the exhaust valves 34 to discharge a gas from the combustion chamber 25 to the exhaust gas when the piston 22 moves from the bottom dead center to the top dead center and then, closing the intake valves 32 and the exhaust valves 34 when the piston 22 moves from the top dead center to the bottom dead center.

(3) A process for controlling timings of opening and closing the intake valves 32 and the exhaust valves 34 to timings capable of increasing a compression work, respectively. For example, a process for closing the exhaust valves 34 and opening the intake valves 32 to suction the air into the combustion chamber 25 when the piston 22 moves from the top dead center to the bottom dead center and then, closing the intake valves 32 and the exhaust valves 34 when the piston 22 moves from the bottom dead center to the top dead center.

(4) A process for increasing an operation torque of an alternator of the engine 10.

(5) A process for increasing an operation torque of the high pressure fuel pump 62.

(6) A process for increasing an operation torque of a compressor of an air conditioner of an air condition system of the vehicle.

In other words, according to the present invention, when the opening degree increase control is not executed upon the satisfaction of the engine stop condition, an engine rotation resistance control for increasing a resistance against the engine rotation to a predetermined resistance. This predetermined resistance is larger than the resistance against the engine rotation immediately before the satisfaction of the engine stop condition.

Further, in the engine stop control according to the embodiment, instead of stopping the fuel ignition upon the satisfaction of the engine stop condition, the fuel ignition may be continued for treating the unburned fuel remaining in the combustion chamber 25 and when a constant time elapses after the satisfaction of the engine stop condition, the fuel ignition may be stopped.

What is claimed is:

1. A control device of a multi-cylinder internal combustion engine installed in a vehicle, the engine comprising:
  at least two combustion chambers;
  at least two fuel injectors provided corresponding to the combustion chambers, respectively, each of the fuel injectors being configured to inject fuel directly into the corresponding combustion chamber;
  a throttle valve for controlling an amount of air supplied to the combustion chambers; and
  at least two ignition devices provided corresponding to the combustion chambers, respectively, each of the ignition devices including an ignition plug,
the control device comprising a control section for controlling operations of the fuel injectors, the throttle valves and the ignition devices,
wherein the control section is configured:
  to execute an engine stop control for causing the fuel injectors to stop injecting fuel to stop a rotation of the engine when a predetermined engine stop condition is satisfied, the predetermined engine stop condition including a condition that a speed of the vehicle is equal to or smaller than an engine stop condition speed;
  to execute an ignition engine start control for causing the fuel injector corresponding to the combustion chamber, an engine stroke of which corresponding to a combustion stroke, to inject fuel and causing the corresponding ignition device to ignite the fuel to start the rotation of the engine when a predetermined ignition engine start condition is satisfied after the start of the engine stop control, the predetermined ignition engine start condition including a condition that an engine start request for starting the rotation of the engine is generated;
  to execute a first opening degree control for controlling an opening degree of the throttle valve to a first opening degree when a particular condition is satisfied, the first opening degree being larger than the opening degree of the throttle valve controlled immediately before the satisfaction of the engine stop condition, the particular condition being a condition that it is predicted upon the satisfaction of the engine stop condition that a level of one of noise and vibration generated in an interior of the vehicle from a source other than the engine is equal to or larger than a predetermined level when the rotation of the engine stops; and
  to execute a second opening degree control for controlling the opening degree of the throttle valve to a second opening degree larger than the first opening degree without executing the first opening degree control when the particular condition is not satisfied upon the satisfaction of the engine stop condition.

2. The control device of the multi-cylinder engine as set forth in claim 1, wherein the particular condition is satisfied when satisfied is a condition that a speed of the vehicle is equal to or larger than a predetermined particular condition speed smaller than the engine stop condition speed.

3. The control device of the multi-cylinder engine as set forth in claim 1, wherein the engine further comprises a starter motor,
  the ignition engine start condition further includes a condition that the first opening degree control is executed, and
  the control section is configured to execute a starter engine start control for starting the rotation of the engine by using the starter motor when a predetermined starter engine start condition is satisfied, the predetermined starter engine start condition including a condition that the engine start request is generated and the second opening degree control is executed after the start of the engine stop control.

4. The control device of the multi-cylinder engine as set forth in claim 3, wherein the starter engine start condition further includes a condition that the rotation speed of the engine is equal to or smaller than a predetermined starter engine start rotation speed.

5. The control device of the multi-cylinder engine as set forth in claim 3, wherein the control section is configured to increase a resistance against the rotation of the engine to a predetermined resistance when the particular condition is not satisfied upon the satisfaction of the engine stop condition, the predetermined resistance being larger than a resistance against the rotation of the engine immediately before the satisfaction of the engine stop condition.

* * * * *